United States Patent [19]
Okabayashi

[11] Patent Number: 5,530,791
[45] Date of Patent: Jun. 25, 1996

[54] AUTOMATIC MANIPULATOR-HEAD TRAJECTORY PRODUCING SYSTEM

[75] Inventor: Keiju Okabayashi, Kawasaki, Japan

[73] Assignee: Fujitsu Limited, Kanagawa, Japan

[21] Appl. No.: 393,022

[22] Filed: Feb. 23, 1995

Related U.S. Application Data

[63] Continuation of Ser. No. 973,814, Nov. 6, 1992, abandoned.

[30] Foreign Application Priority Data

Nov. 8, 1991 [JP] Japan ................................. 3-293142

[51] Int. Cl.$^6$ .................................................. B25J 13/00
[52] U.S. Cl. ............................................ 395/90; 364/461
[58] Field of Search ................................. 364/461, 478; 395/85, 90, 904

[56] References Cited

U.S. PATENT DOCUMENTS

| | | | |
|---|---|---|---|
| 4,862,373 | 8/1989 | Meng | 395/90 |
| 4,879,663 | 11/1989 | Fuehrer | 395/87 |
| 4,949,277 | 8/1990 | Trovato et al. | 395/89 |
| 5,047,916 | 9/1991 | Kondo | 395/90 |
| 5,072,361 | 12/1991 | Davis et al. | 395/83 |
| 5,150,026 | 9/1992 | Seraji et al. | 395/90 |

FOREIGN PATENT DOCUMENTS

| | | |
|---|---|---|
| 0298128 | 1/1989 | European Pat. Off. . |
| 61-131001 | 11/1986 | Japan . |

OTHER PUBLICATIONS

"Automatic Generation of Trajectory Planners for Industrial Robots", Kang G. Shin, et al., 1986 IEEE International Conference on Robotics and Automation, Apr. 1986.

Yu et al, "An Approach to On-Line Obstacle Avoidance for Robot Arms" IEEE/RSJ Int'l Workshop on Intelligent Robots and Systems Nov 3–5 1991, pp. 583–588 vol. 2.

Warren, "Multiple Robot Path Coordination Using Artificial Potential Fields", Proc 1990 IEEE Confon Robotics & Automation, May 13–18 1990, pp. 500–505 vol. 1.

*Primary Examiner*—Robert W. Downs

[57] ABSTRACT

In a remote operation system using a manipulator-head, a trajectory of the manipulator head is automatically produced on the basis of an execution environment of a manipulator by using an automatic manipulator-head trajectory producing system. The automatic manipulator-head trajectory producing system includes a template storage memory, a shape register, an obstacle detecting section, a size decision section, a size register, a template limiting section, a priority order granting section, a first interference inspecting section, a curve interpolation section and a second interference inspecting section. The trajectory templates are registered in the template storage memory, then an interference of the manipulator with an obstacle is inspected by the obstacle detecting section based on each trajectory template. As a result of such an inspection, a priority is made for the templates inspected to have no interference with the obstacle. Then the manipulator-head trajectory is automatically produced by previously estimating the priority of the templates. As a result, the manipulator-head trajectory can automatically be produced in a reduced time with a smaller memory capacity.

15 Claims, 47 Drawing Sheets

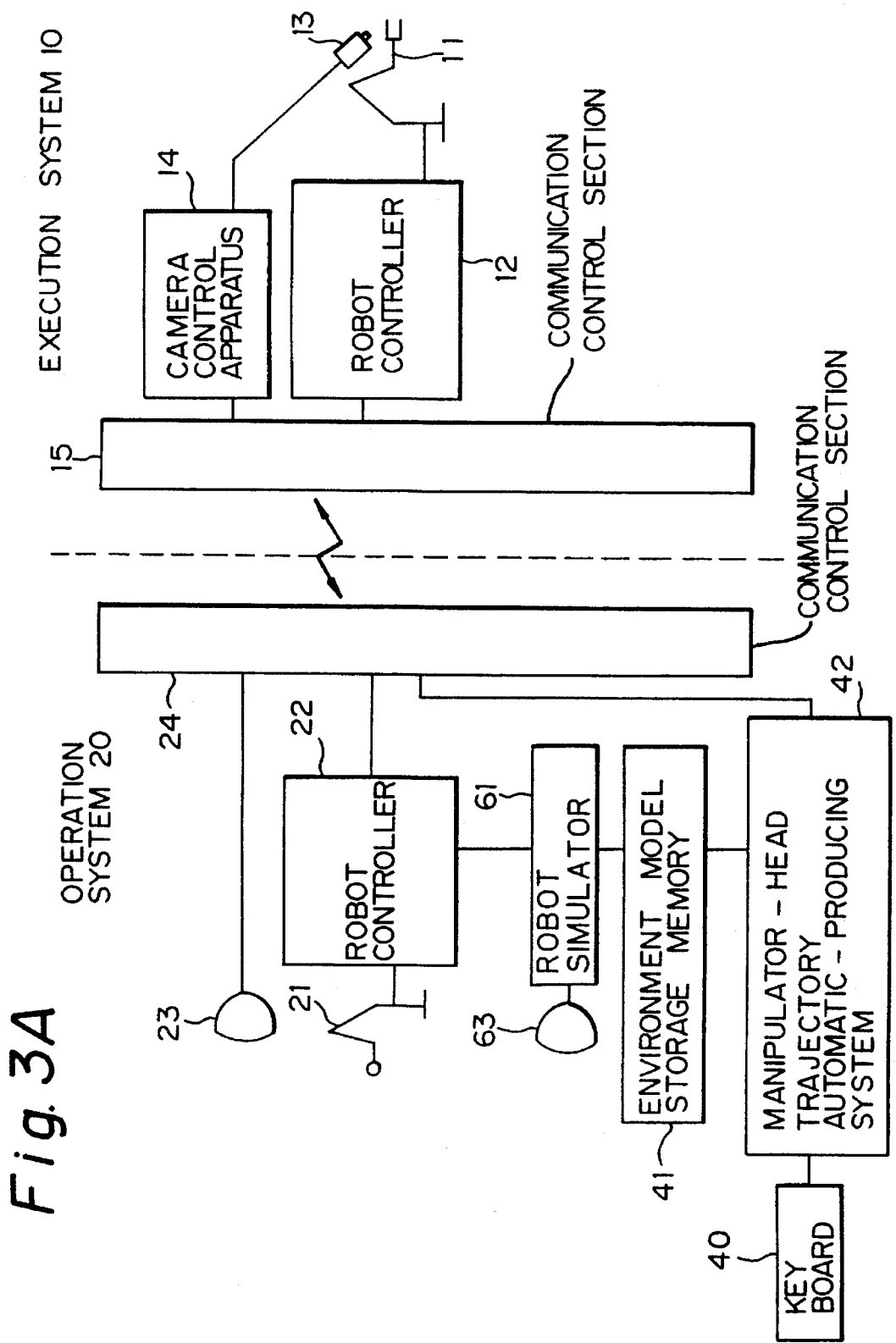

Fig. 4A
| GROUP | NAME OF TEMPLATE | TYPE OF TEMPLATE | SHAPE | |
|---|---|---|---|---|
| 1 | T1 | L UPSIDE DOWN |  | SIDE VIEW |
| 1 | T2 | L INSIDE OUT AND UPSIDE DOWN | 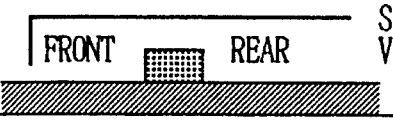 | SIDE VIEW |
| 1 | T3 | U UPSIDE DOWN | 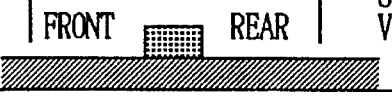 | SIDE VIEW |
| 2 | T4 | L INSIDE OUT | 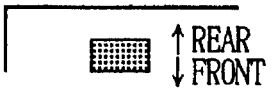 | PLAN VIEW |
| 2 | T5 | L |  | PLAN VIEW |
| 2 | T6 | U | 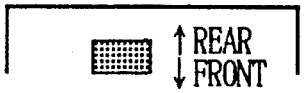 | PLAN VIEW |
| 3 | T7 | L UPSIDE DOWN |  | PLAN VIEW |
| 3 | T8 | L INSIDE OUT AND UPSIDE DOWN | 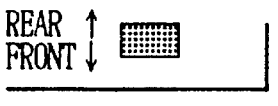 | PLAN VIEW |
| 3 | T9 | U UPSIDE DOWN | 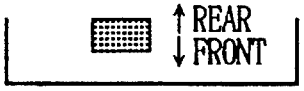 | PLAN VIEW |
| 4 | T10 | U TURNED IN 90 DEGREE ARC | 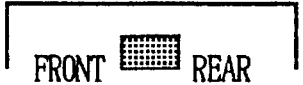 | PLAN VIEW |
| 4 | T11 | U REVERSE-TURNED IN 90 DEGREE ARC | 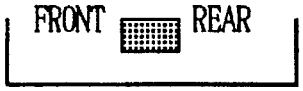 | PLAN VIEW |

Fig. 4B
(GROUP 1)
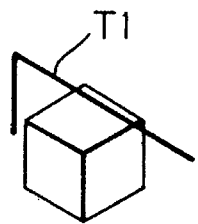 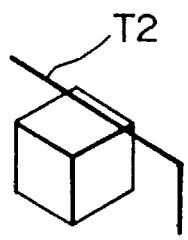 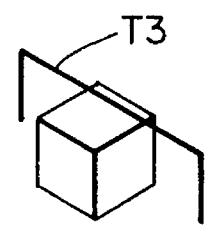
 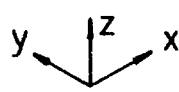 
(GROUP 2)
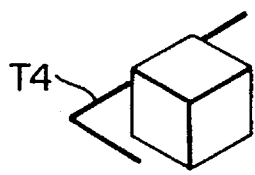 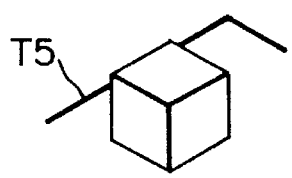 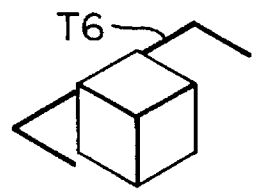
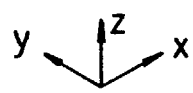 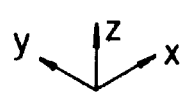 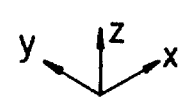
(GROUP 3)
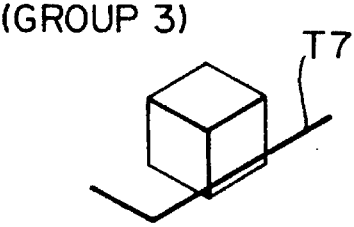 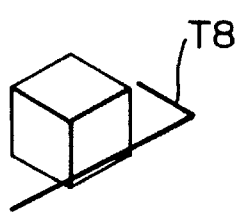 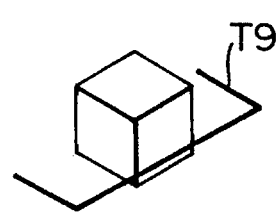
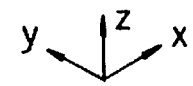 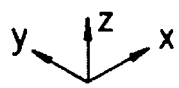 
(GROUP 4)
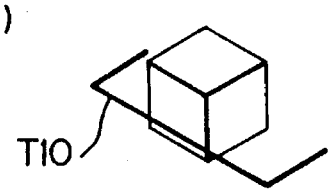 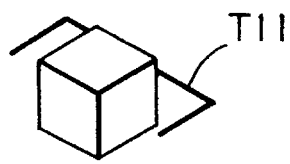
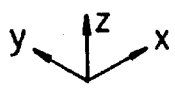 

m1
(θ5 IS NEGATIVE)

(θ5 IS POSITIVE)

(CASE 1) UNCONDITIONALLY A PATH IN FRONT OF THE OBSTACLE IS NOT AVAILABLE.
(T7, T8, T9, T10, T11)

(CASE 2) WHEN xmin < xmin - LIMIT,
A PATH BEHIND THE OBSTACLE IS NOT AVAILABLE.
(T4, T5, T6)

(CASE 3) WHEN TOP > TOP-LIMIT,
A PATH ABOVE THE OBSTACLE IS
NOT AVAILABLE.
(T1, T2, T3)

(CASE 1) WHEN TOP > TOP-LIMIT,
A PATH ABOVE THE OBSTACLE IS NOT ABAILABLE.
(T1,T2,T3)

(CASE 2) WHEN xmax>xmax-LIMIT,
A PATH IN FRONT OF THE OBSTACLE
IS NOT ABAILABLE.
(T7, T8, T9)

(CASE 3) WHEN $xmin > xmin - LIMIT$,
A PATH BEHIND THE OBSTACLE IS NOT AVAILABLE.
(T4, T5, T6)

ENVIRONMENT EVALUATION I ON XY PLANE

ENVIROMENT EVALUATION 2 ON XY PLANE

ENVIRONMENT EVALUATION ON ZY PLANE

Fig. 19

| POINT | EVALUATION REFERENCE |
|---|---|
| 3 | MOST EFFECTIVE |
| 2 | EFFECTIVE |
| 1 | SOME POSSIBILITIES |
| 0 | LESS POSSIBILITIES |

REFERENCE OF POINT (1) xmax < STARTING POINT AND xmax < TERMINATING POINT (2) xmax < STARTING POINT AND xmin < TERMINATING POINT < xmax (3) xmax < STARTING POINT AND TERMINATING POINT < xmin (4) xmin < STARTING POINT < xmax AND xmax < TERMINATING POINT (5) xmin < STARTING POINT < xmax AND xmin < TERMINATING POINT < xmax (6) xmin < STARTING POINT < xmax AND TERMINATING POINT < xmin

| TEMPLATE | POINT |
|----------|-------|
| T4  | 3 |
| T6  | 1 |
| T8  | 3 |
| T9  | 1 |
| T10 | 1 |
| T11 | 1 |

(7) STARTING POINT < xmin AND xmax < TERMINATING POINT (8) STARTING POINT < xmin AND xmin < TERMINATING POINT < xmax

| TEMPLATE | POINT |
|---|---|
| T6 | 2 |
| T9 | 1 |

(9) STARTING POINT < xmin AND TERMINATING POINT < xmin

(10) ymin < STARTING POINT < ymin AND ymin < TERMINATING POINT < ymax (1) TOP  STARTING POINT AND TOP  TERMINATING POINT

| TEMPLATE | POINT |
|---|---|
| T1 | 3 |
| T3 | 1 |

(2) TOP < STARTING POINT AND TERMINATING POINT

| TEMPLATE | POINT |
|---|---|
| T2 | 3 |
| T3 | 1 |

(3) STARTING POINT   TOP AND TOP   TERMINATING POINT (4) STARTING POINT < TOP AND TERMINATING POINT < TOP

Fig. 38

EXAMPLE OF PRIORITY ORDER TABLE

| CASE \ PRIORITY ORDER | 1 | 2 | 3 | 4 | 5 | 6 | 7 | 8 | 9 | 10 | 11 |
|---|---|---|---|---|---|---|---|---|---|---|---|
| 1 | T3 | T9 | T1 | T2 | T7 | T8 | T4 | T5 | T6 | T10 | T11 |
| 2 | T1 | T3 | T9 | T7 | T8 | T2 | T4 | T5 | T6 | T10 | T11 |
| 3 | T2 | T3 | T9 | T7 | T1 | T8 | T4 | T5 | T6 | T10 | T11 |
| 4 | T3 | T2 | T1 | T9 | T7 | T8 | T4 | T5 | T6 | T10 | T11 |
| 5 | T7 | T9 | T3 | T10 | T2 | T1 | T8 | T4 | T5 | T6 | T11 |
| ... | | | | | | | | | | | |
| 40 | T10 | T11 | T3 | T2 | T1 | T7 | T8 | T4 | T5 | T6 | T9 |

ENVIRONMENT EVALUATION ON zy PLANE (1) → 1
(2) → 2
(3) → 3
(4) → 4
(1) → 5
⋯
(4) → 40

ENVIRONMENT EVALUATION ON xy PLANE (1)
(1)
(1)
(1)
(2)
⋯
(10)

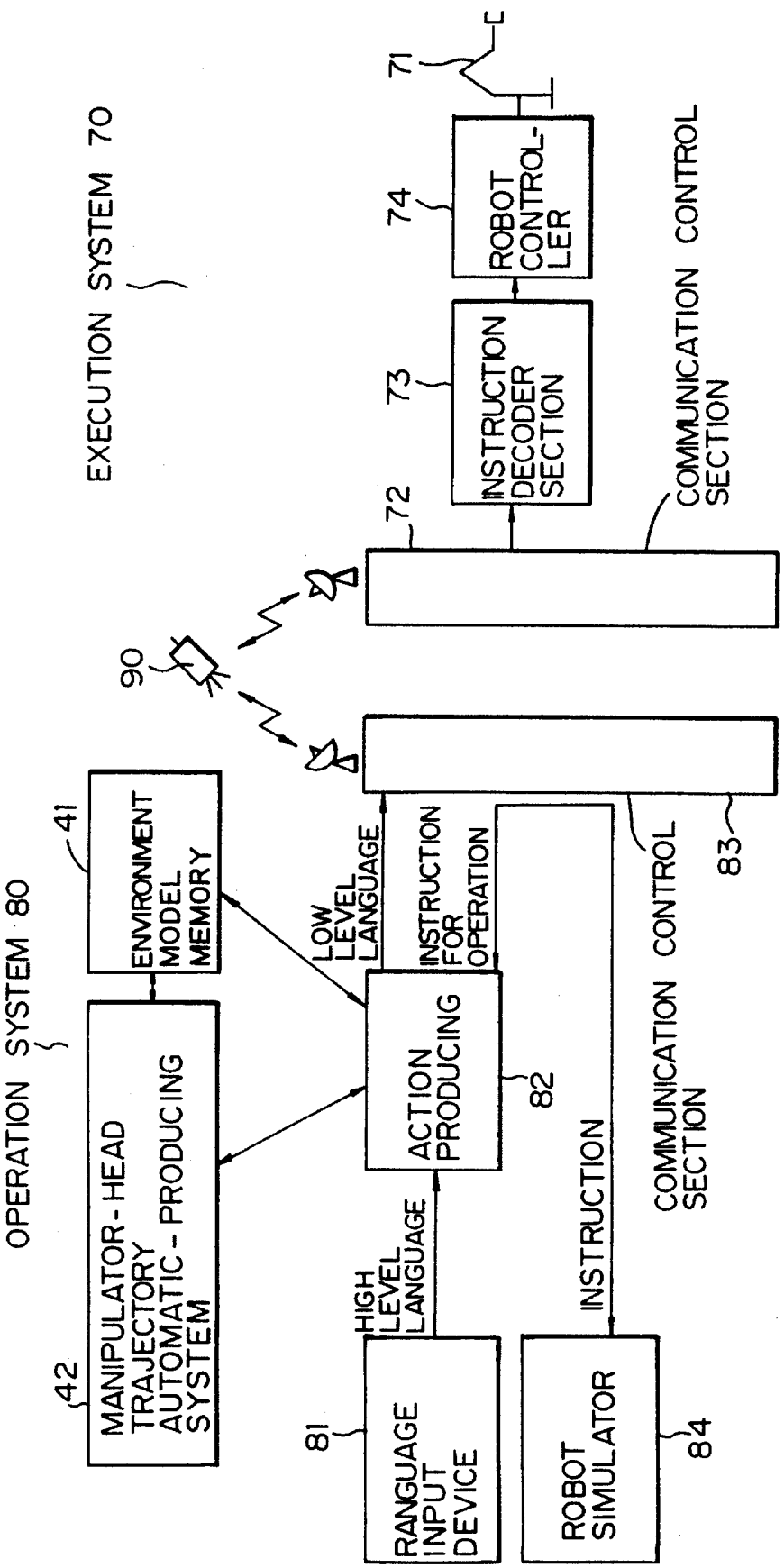

AUTOMATIC MANIPULATOR-HEAD TRAJECTORY PRODUCING SYSTEM

This is continuation, of application Ser. No. 07/973,814, filed Nov. 6, 1992 now abandoned.

BACKGROUND OF THE INVENTION

1. Field of the invention

The present invention relates to an automatic manipulator-head trajectory producing system for automatically producing a trajectory of a manipulator head on the basis of an execution environment of the manipulator.

2. Description of the Related Art

Generally, operations of a manipulator are often required in extreme environments such as atomic power plants, submarines, and outer space where it is impossible for persons to directly work. The manipulators used for such ultimate environments must be remote-controlled at a distance from working sites thereof.

Conventionally, the remote operations of the manipulators have been performed based on a master/slave system. The remote operation system by a master/slave system is separated into an execution system arranged at the working site and an operation system arranged at a supervising center.

The execution system has a slave manipulator, a robot controller, a supervising camera, a camera control apparatus, and a communication control section. On the other hand, the operation system has a master manipulator, a robot controller, a monitor, and a communication control section. In such systems, the slave manipulator is remotely operated by a person who operates the manipulator (hereinafter simply referred to as "an operator") operating the master manipulator.

However, in this system, the operator cannot directly observe the working site, and is required to work depending on a limited number of observation cameras. A problem arises in that an increased time for carrying out the operation is required because the operator must always work while being careful to avoid collisions of the manipulator.

An effective method of reducing such an operator's burden includes realizing an autonomous operation of the manipulator. In particular, it is significantly effective to achieve the autonomous operation for a manipulator-head trajectory producing function. A prior art method of achieving autonomous operation Of the manipulator-head trajectory has been that a working space of the manipulator is partitioned into a mesh in a horizontal plane and a vertical plane (in other words, the working space of the manipulator is divided into a small cubic space) and then based on the resultant mesh the manipulator-head trajectory is searched.

However in this method, an accuracy of the manipulator-head trajectory depends on the partitioning number in the mesh, and this results in a problem that, to obtain a manipulator-head trajectory having less interference with obstacles, a memory capacity must be increased. Further, a complicated research process must be repeated at every partitioning point, and thus a considerably increased time is disadvantageously required for producing the manipulator-head trajectory.

As hereinbefore described in relation to the prior art, the mesh is employed for automatically producing the trajectory of the manipulator-head, and the problem is requirement of a larger capacity memory and a large amount of operation time.

SUMMARY OF THE INVENTION

An object of the present invention is to provide an automatic manipulator-head trajectory producing system which is capable of automatically producing a trajectory of a manipulator-head with a smaller memory capacity within a reduced time.

According to the present invention, there is provided an automatic manipulator-head trajectory producing system having a trajectory template register means for previously registering a plurality of trajectory templates designating an estimated head-trajectory of a manipulator on the basis of an execution environment of the manipulator and a manipulator-head trajectory producing means for producing the head trajectory by inspecting an interference of the manipulator and an obstacle at every trajectory template previously registered by the trajectory template register means.

According to the present invention, the trajectory template is registered by the trajectory template register means, then an interference of the manipulator with an obstacle is inspected based on each trajectory template by the manipulate-head trajectory producing means. If as a result of such an inspection a decision is made that the interference is not generated, a manipulator-head trajectory of the manipulator is produced based on the trajectory template for which a decision is made that the interference is not generated.

According to such a constitution, a capacity of a memory in this case is satisfied if the memory is capable of registering the trajectory template 35, and thus the capacity of the memory can be made smaller compared to the case of registering the mesh.

Since this constitution is such that the manipulator-head trajectory is produced previously by estimating the manipulator-head trajectory and by inspecting whether or not this estimation is suitable, a time required for producing the manipulator-head trajectory can be reduced, compared to the case of researching the manipulator-head trajectory by using the mesh.

BRIEF DESCRIPTION OF THE DRAWINGS

The present invention will be more clearly understood from the description set forth below with reference to the accompanying drawings, wherein;

FIG. 3A is a constitutional block diagram showing a remote operation system of a manipulator-head trajectory according to the present invention;

FIG. 4A is an illustrative view of shapes of trajectory templates T;

FIG. 4B is a perspective view showing the shapes of trajectory templates T1 to T11 against the obstacle;

FIG. 19 is an illustrative view explaining a process of assigning points;

FIG. 38 is an illustrative view showing a second embodiment of the present invention explaining an assignment of the different priority order to the trajectory templete;

FIG. 44 is a block diagram of an application of the automatic manipulator-head trajectory producing system according to the present invention to a space robot system.

DESCRIPTION OF THE PREFERRED EMBODIMENTS

Before describing the preferred embodiments, an explanation will be given of the conventional construction of the coupling part of an intermediate frequency amplifying circuit and an active filter of the mobile communication system, with reference to FIGS. 1 to 6.

Figure 1:
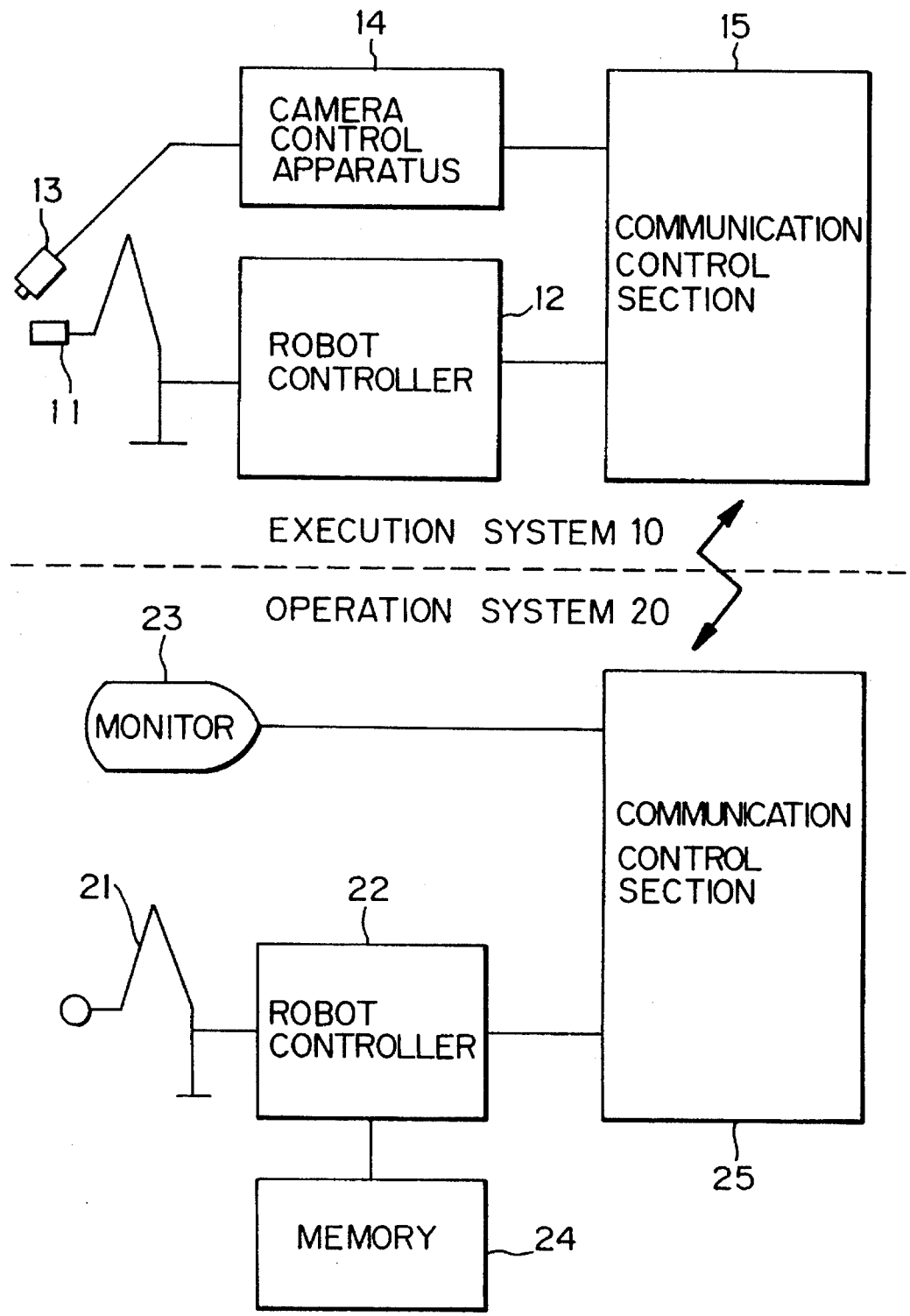
FIG. 1 is a constitutional block diagram showing a conventional remote operation system of a manipulator-head trajectory.

Conventionally, the remote operations of the manipulators have been performed based on a master/slave system. FIG. 1 is a block diagram of the prior art remote operation system by a master/slave system. The system in FIG. 1 is separated into an execution system 10 arranged at the working site and an operation system 20 arranged at a supervising center.

In the execution system 10, numeral 11 denotes a slave manipulator, 12 denotes a robot controller, 13 denotes a supervising camera, 14 denotes a camera control apparatus, and 15 denotes a communication control section. In the operation system 20, numeral 21 denotes a master manipulator, 22 denotes a robot controller, 23 denotes a monitor, 24 denotes a memory and 25 denotes a communication control section. In such systems, the slave manipulator 11 is remotely operated in a way that an operator operates the master manipulator 21.

However, in this system, the operator cannot directly observe the working site, and is required work depending on a limited number of observation cameras 13. A problem arises in that an increased time for carrying out the operation is required because the operator must always work while being careful to avoid collisions of the manipulator.

Figure 2:
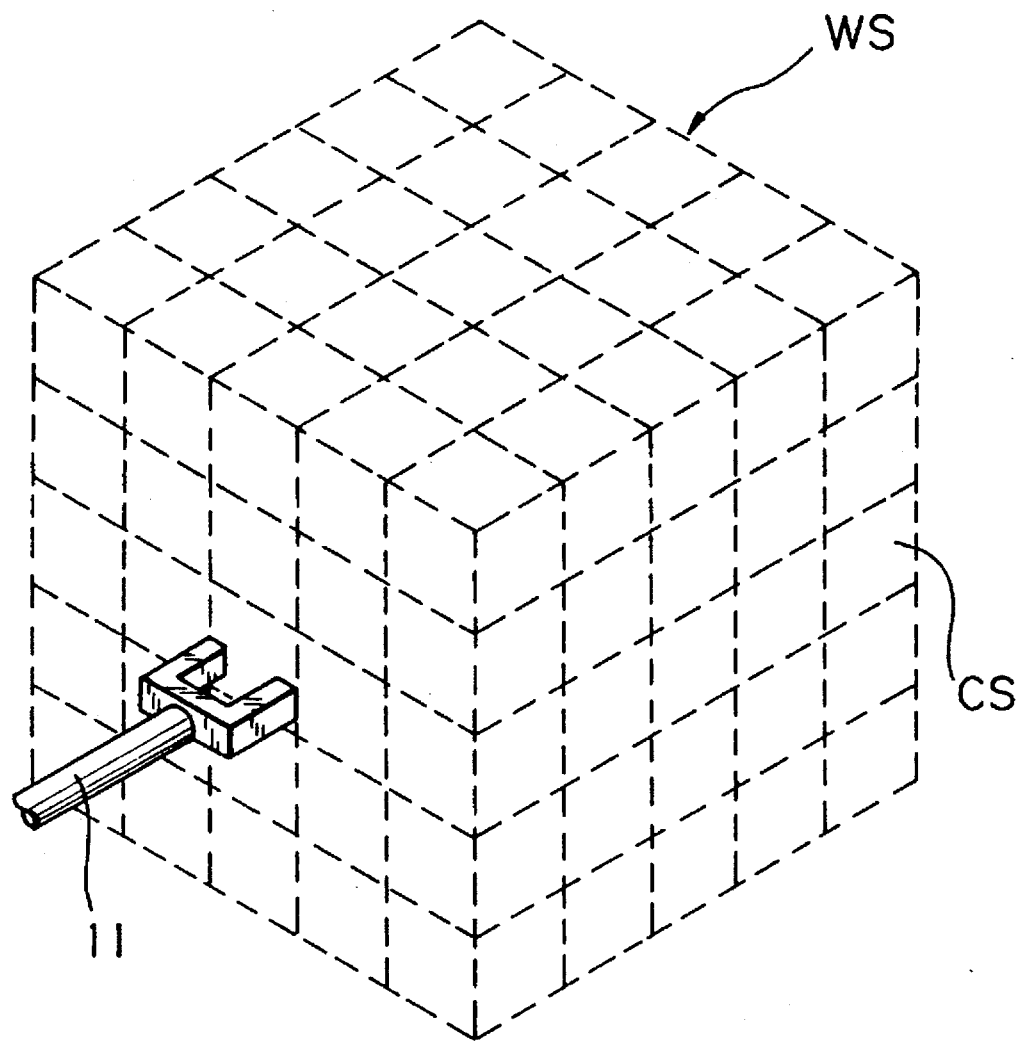
FIG. 2 is a perspective view of a working space of the manipulator partitioned into a mesh.

An effective method Of reducing such an operator's burden includes to realize an autonomous operation of the manipulator. In particular, it is significantly effective to achieve the autonomous operation for a manipulator-head trajectory producing function. A prior art method of achieving autonomous operation of the manipulator-head trajectory is shown in FIG. 2. In the prior art, a working space WS of the manipulator 11 is partitioned into a mesh in a horizontal plane and a vertical plane, that is, the working space WS of the manipulator 11 is divided into a small cubic space CS and then the manipulator-head trajectory is searched by using the cubic space CS.

However in this method, an accuracy of the manipulator-head trajectory depends on the partitioning number in the mesh (= a number of cubic space CS), and this results in a problem that, to obtain manipulator-head trajectory having less interference with obstacles, a memory capacity must be increased. Further, a complicated research process must be repeated at every partitioning point (= a boundary plane of the cubic space CS), and thus a considerably increased time is disadvantageously required for producing the manipulator-head trajectory.

As hereinbefore described in relation to the prior art, the mesh is employed for automatically producing the trajectory of the manipulator-head, and the problem is requirement of a larger capacity memory and a large amount of operation time.

The following will describe a remote operation system using an automatic manipulator-head trajectory producing system according to the present invention used for producing the manipulator-head trajectory. FIG. 3A is a block diagram of the system constitution where the present invention is applied to produce a manipulator-head trajectory in the remote operation system illustrated in FIG. 1. Accordingly, in FIG. 3, the same parts as used in FIG. 1 are assigned the same reference numerals and the explanation thereof is omitted.

In FIG. 3A, the operation system 20 of the remote operation system further comprises a keyboard 40, an environment model storage memory 41, an automatic manipulator-head trajectory producing system 42, a robot simulator 61 and a display 63. In the remote operation system thus constructed, since the automatic manipulator-head trajectory producing system 42 is added thereto, then the operator may only instruct the end point E at least, and is not required to instruct the head trajectory of the slave manipulator 11 by using the master manipulator 21.

The positional information of the end point E is input by the operator, and then the head trajectory of the slave manipulator 11 is automatically produced, by the automatic manipulator-head trajectory producing system 42, from both the positional information of the end point E which is input by the operator and the positional information of the starting point S which is obtained by an inquiry made to the slave manipulator established within the environment model.

Note, the positional information of the end point E Can be input, for example, as numerical data (a coordinate of the head of the slave manipulator 11), by using a keyboard 40. But, to input more intuitively it can be input by using the robot simulator 61.

When the operator operates the master manipulator 21, a virtual manipulator pictured on a display 63 of the robot simulator 61 is activated, so that the head of the manipulator is moved to the end point E, and thus the end point E is instructed. In this operation, the operator simply instructs the end point E because it is not required that the operator operate the head of the virtual manipulator to move in a manner to avoid the obstacle O1. The detailed construction of the automatic manipulator-head trajectory producing system 42 and the operation thereof will be explained hereinafter.

Figure 3B:
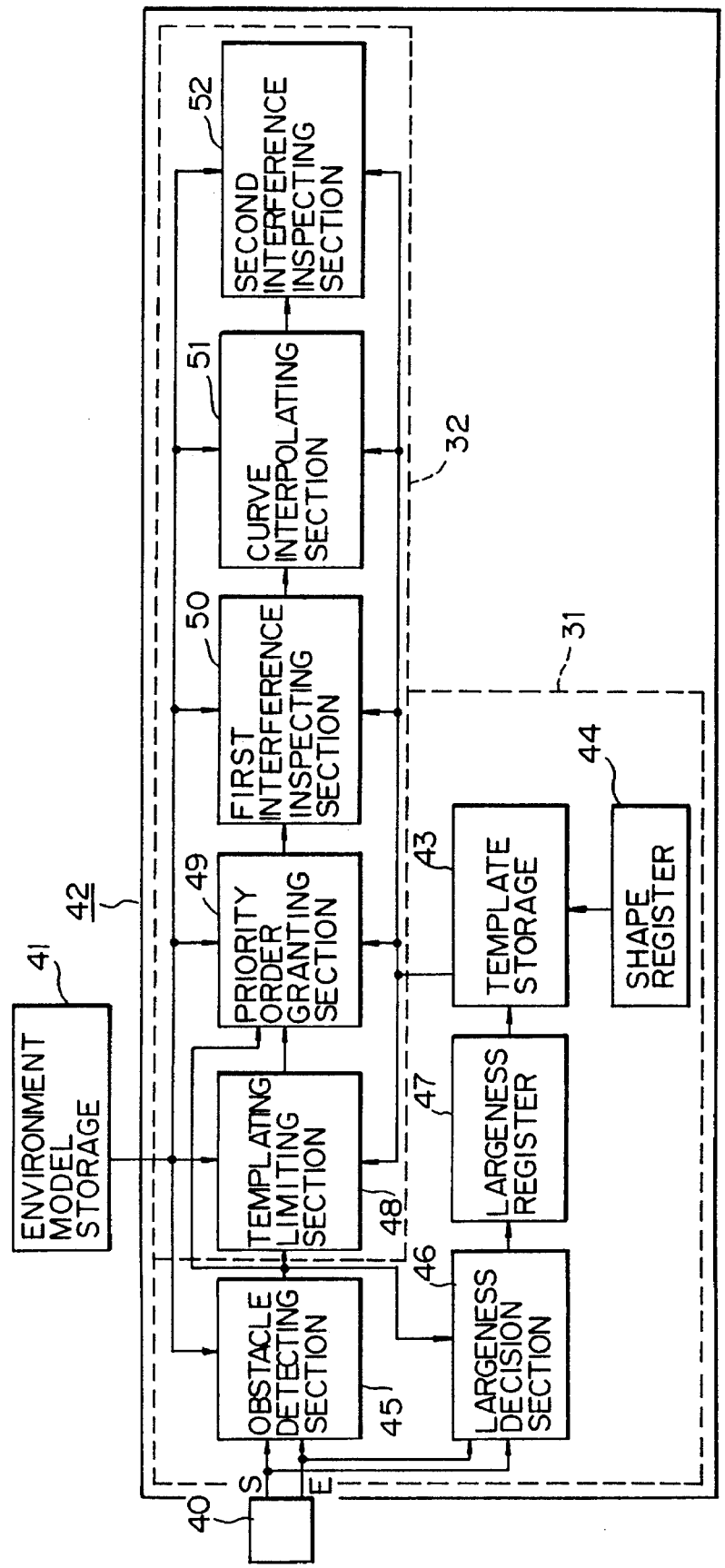
FIG. 3B is a block diagram of a constitution of a first embodiment of the automatic manipulator-head trajectory producing system in FIG. 3A.

FIG. 3B shows a detailed construction of the automatic manipulator-head trajectory producing system 42 according to the one embodiment of the present invention and the connection thereof to the keyboard 40 and the environment model storage memory 41. The automatic manipulator-head trajectory producing system 42 is composed of a trajectory template register means 31 and a manipulator-head trajectory producing means 32. The trajectory template register means 31 includes a template storage memory 43, a shape register 44, an obstacle detecting section 45, a size decision section 46, and a size register 47, and the manipulator-head trajectory producing means 32 includes a template limiting section 48, a priority order granting section 49, a first interference inspecting section 50, a curve interpolation section 51 and a second interference inspecting section 52.

The environment model storage memory 41 stores an environment model showing an execution environment of the manipulator (an arrangement or the like of the manipulator and obstacles). The automatic manipulator-head trajectory producing system 42 automatically produces the trajectory of the manipulator-head on the basis of the environment model stored in this environment model storage memory 41.

The template storage memory 43 stores the trajectory template showing the manipulator-head trajectory in the manipulator-head trajectory producing system 42. The shape register 44 previously registers the shape information of a plurality of trajectory templates showing the estimated manipulator-head trajectory in the template storage memory 43 in advance to produce the manipulator-head trajectory. The obstacle detecting section 45 detects the obstacle prior to an operation of the manipulator. The size decision section 46 determines a size of the trajectory template T. The size register 47 registers the size information of the trajectory template T determined by the size decision section 46 in the template storage 43. The template limiting section 48 limits the available trajectory templates T from among the trajectory templates T registered in the template storage 42, based on an attitude mode "m" of the manipulator M. The priority order granting section 49 grants a priority order based on the execution environment, to the trajectory template T which is determined as available by the template limiting section 48. The first interference inspecting section 50 inspects an interference of the trajectory template T with the obstacle O1 on the environment model in a process in which the trajectory template T is read from the template storage 42 in the order of a higher priority order on the basis of the priority order assigned by the priority order assigning section 49. The curve interpolation section 51 produces the trajectory data of the manipulator M when the first interference inspecting section 50 determines that the interference is not generated, by interpolating the trajectory template T for which the above decision has been made based on the environment model on the basis of an operational characteristic of the manipulator M. The second interference inspecting section 52 executes a detailed interference-inspection between the manipulator M and the obstacle O1 by performing a simulation on the environment model on the basis of the trajectory data produced by the curve interpolation section The trajectory template, within the above environment model, is expressed, for example, as a virtual object which is produced by coupling a cube C (which will be explained later) such as a rectangular parallelepiped and the like. When such a trajectory template is registered to the template storage 43, the registration is made for its shape information and size information, which will hereinafter be described in detail.

FIG. 4A is a concrete example of shapes of trajectory templates T registered in the shape register 44. The shapes of trajectory templates T shown in FIG. 4A basically include two types, L and U character shapes, but depending on directions they are separated into 4 groups having 11 shapes in total.

Trajectory templates T1 to T3 included in group represent a manipulator-head trajectory passing above the obstacle (a positive direction on the "z" coordinate). Trajectory templates T4 to T6 included in group 2 represent a manipulator-head trajectory passing behind the obstacle (a negative direction on the "x" coordinate). Trajectory templates T7 to T9 included in group 3 represent a manipulator-head trajectory passing in front of the obstacle (a positive direction on the "x" coordinate). Trajectory templates T10 and T11 included in group 4 represent manipulator-head trajectories passing on the left side of the obstacle (a positive direction on "y" coordinate) or passing on the right side of the obstacle (a negative direction on "y" coordinate) respectively when viewed from the top. Three dimensional shapes of the trajectory templates T1 to T11 against the obstacle are shown in FIG. 4B.

Figure 5:
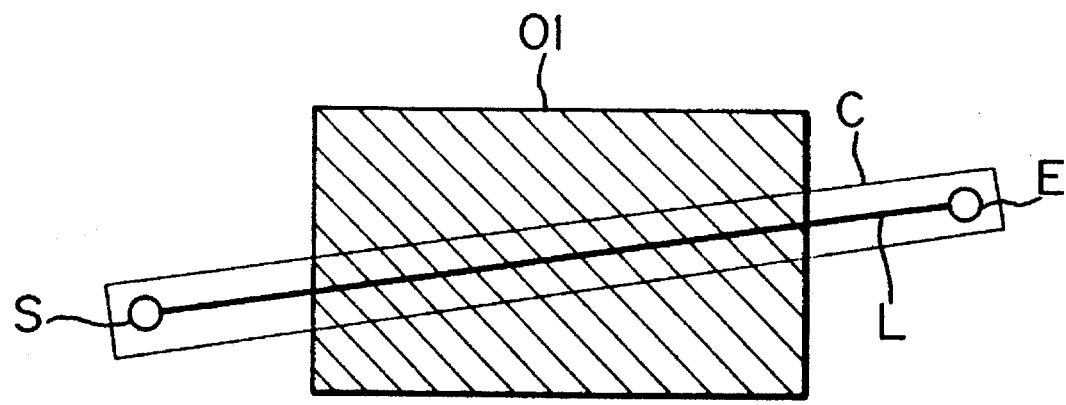
FIG. 5 is an illustrative view of a detecting process of the obstacle.

The obstacle detecting section 45 detects the obstacle, based on a present position (hereinafter referred to as "a starting point") and a target position (hereinafter referred to as "an end point") of the manipulator and based on the environment model stored in the environment model storage 41. In the obstacle detecting section 45, for example as shown in FIG. 5, objects existing on a straight trajectory L from a starting point S to an end point E established within the environment model are all considered as an obstacle O1.

However, in such a detection, the cubes C such as a rectangular parallelepiped and the like are actually used on the straight trajectory L in consideration of the manipulator-head and the size of the object which the manipulator holds. Positional information of the starting point S is automatically held within the system by requiring an answer from the manipulator established within the environment model. In other words, positional information of the starting point S is automatically obtained by examining the environment model. In contrast, positional information of the end point E is input by the operator prior to an operation of the manipulator.

The size of the trajectory template T is regulated by widths of the cubes which constitute both positions of relaying points and the template T. In this case, each "relaying point" represents a coupling point of the cubes constituting the trajectory template T.

Figure 6:
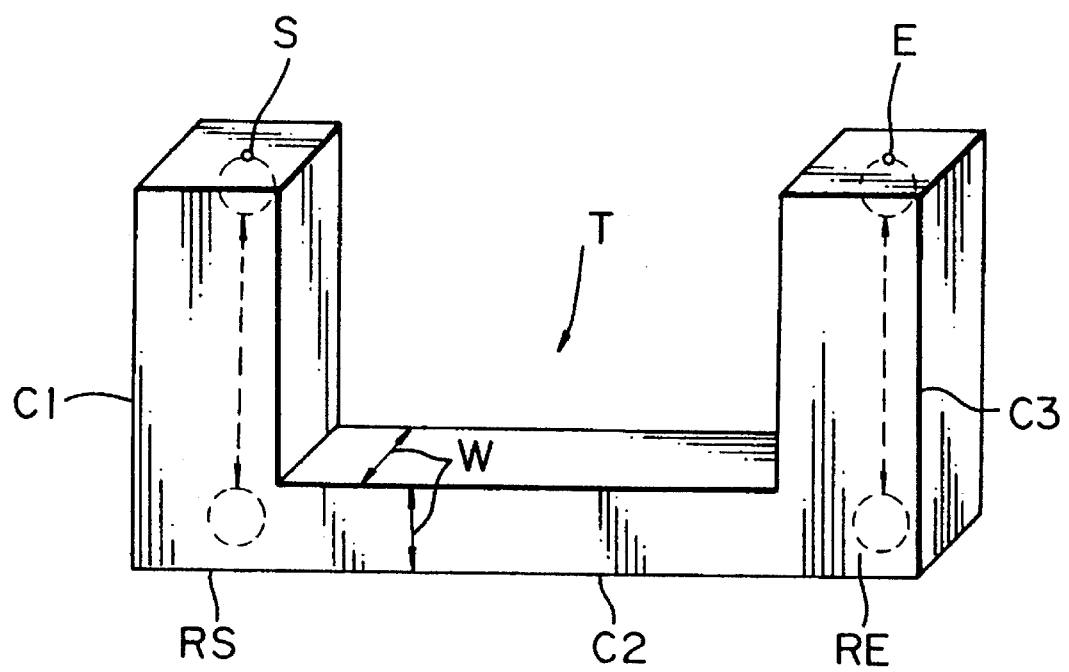
FIG. 6 is an illustrative view showing a shape and relaying points of the trajectory template.

FIG. 6 is an illustrative view of widths W of relaying points R and cubes C of a U shaped type trajectory template T. As shown in FIG. 6, the U shaped trajectory template T is composed of three cubes C1 to C3. Accordingly, RS and RE are provided as a relaying point R, where RS denotes a relaying point R corresponding to the starting point s and RE a relaying point R corresponding to the end point E. A position of the relaying point RS is regulated by a relative position from the starting point S, and a position of the relaying point RE is regulated by a relative position from the end point E. Although details will be omitted, in the n shaped trajectory template T, the number of relaying points R is reasonably equal to only one, and the position of the relaying point R is regulated, for example, by a relative position from the starting point S.

The size decision section 46 determines a world position of the relaying point R on the basis of a size of the obstacle O1 detected by the obstacle detecting section 45. In this way, when the trajectory template T is previously registered, the trajectory template T can be registered only by the shape information, thus resulting in reducing the number of registers.

Figure 7:
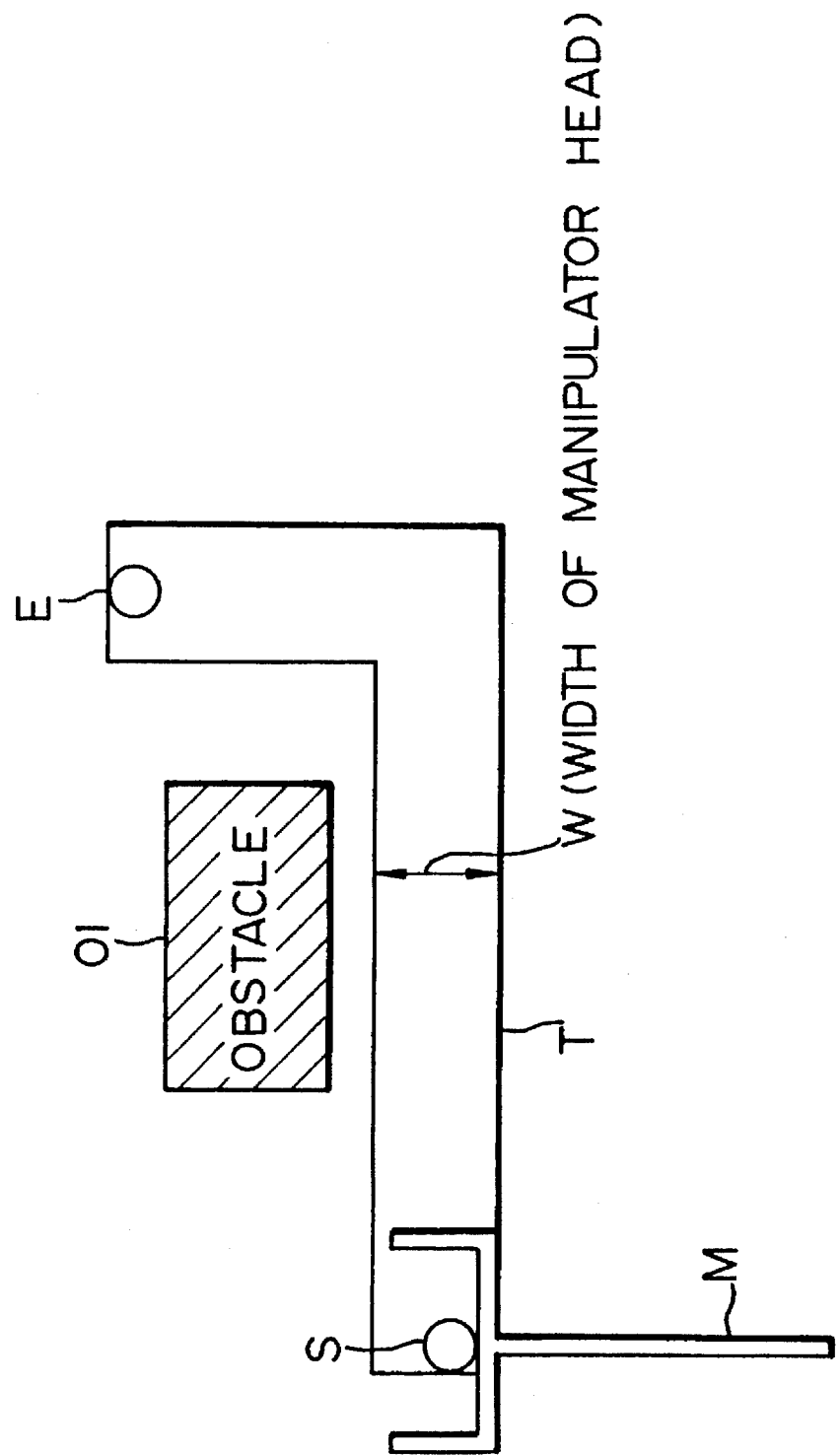
FIG. 7 is an illustrative view showing a starting point S when the manipulator does not hold anything.
Figure 8:
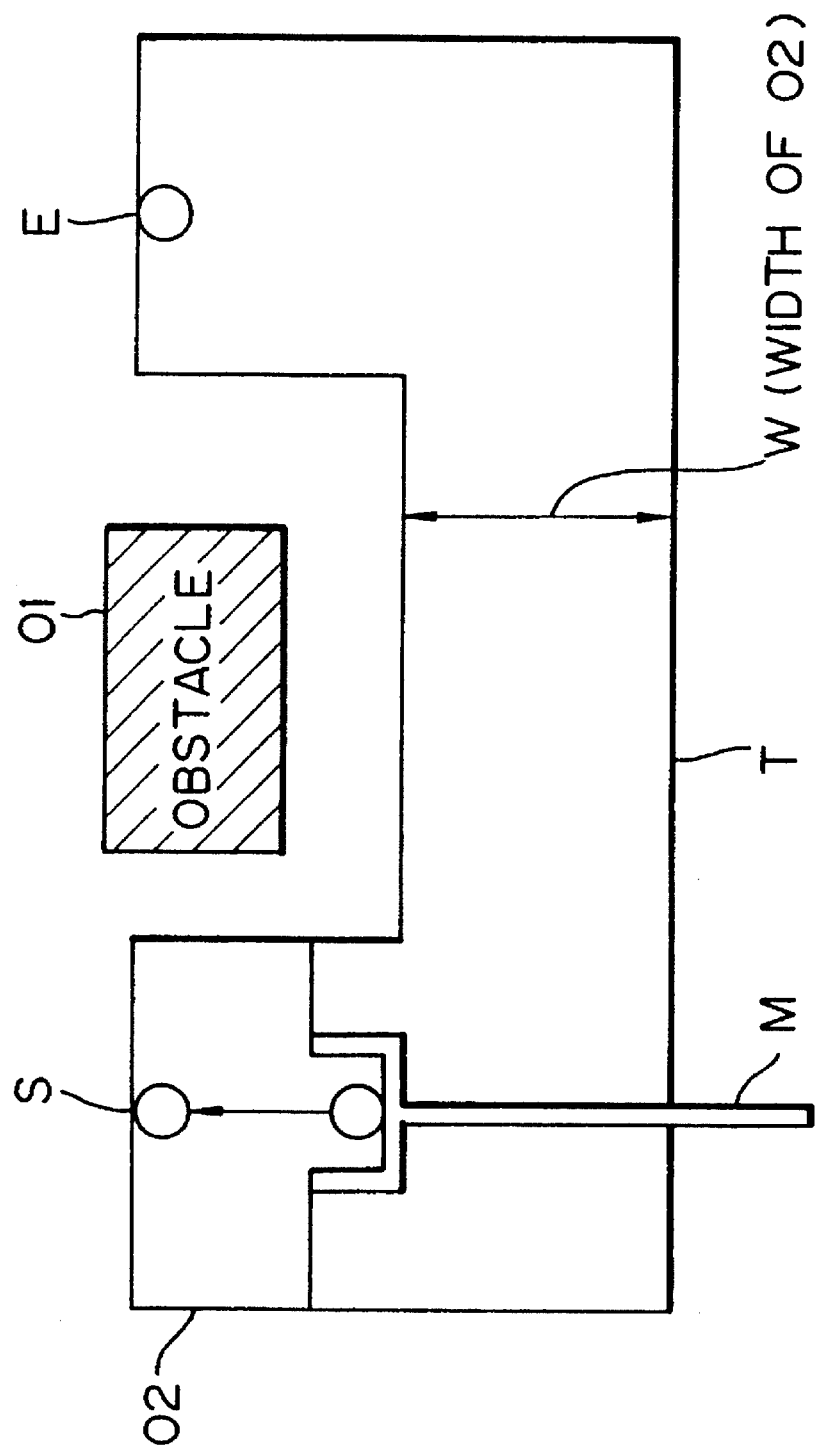
FIG. 8 is an illustrative view showing a transfer of a starting point S when the manipulator holds an object

A position of the starting point S, when the manipulator does not hold anything, is coincident to the position of the manipulator-head as shown in FIG. 7, where M represents a manipulator established within the environment model. In contrast, when the manipulator M holds an object O2, a position of the starting point S is coincident to an end of the object O2 thus held, as shown in FIG. 8. Therefore, the starting point S fed from the environment model in response to an inquiry of the manipulator-head trajectory producing system 41 is a position in consideration of the size of the held object O2.

In a comparison of FIG. 7 with FIG. 8, even when a positional relationship of the manipulator M with the obstacle O1 detected by the obstacle detecting section 45 is not varied, then it is found that the trajectory template T to be used is different depending on whether or not the held object O2 is present. The width W of the cube C constituting the trajectory template T described above is determined by a size of the head of the manipulator M when the manipulator M does not hold the object O2, and the same is determined by a size of the held object O2 when the manipulator M holds the object O2. Accordingly, the size decision section 46 determines a width W on the basis of a size of the head of the manipulator M when the manipulator M does not hold the object O2, and the same determines the width W on the basis of a size of the held object O2 when the manipulator M holds the object O2.

The size register 47 registers the size information of the trajectory template T determined by the size decision section 46 in the template storage 43. Such a registration is executed, by the shape register 44, for all the trajectory templates T in which only the shape information is previously registered.

The template limiting section 48 limits the available trajectory templates T from among the trajectory templates T registered in the template storage 42, based on an attitude mode "m" of the manipulator M. A concrete example of a template limiting process of the template limiting section 48 will be described using a six-freedom vertical multi-articulation type manipulator as a manipulator M.

Figure 9A:
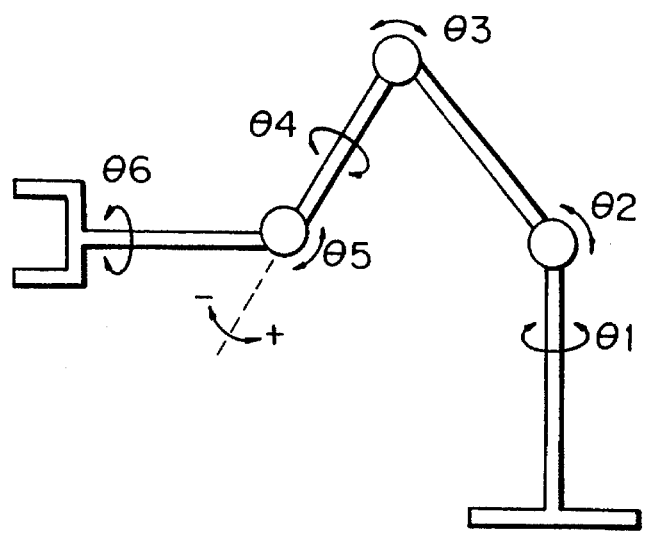
FIG. 9A is an illustrative view of an attitude mode of a manipulator when θ5 is negative.
Figure 9B:
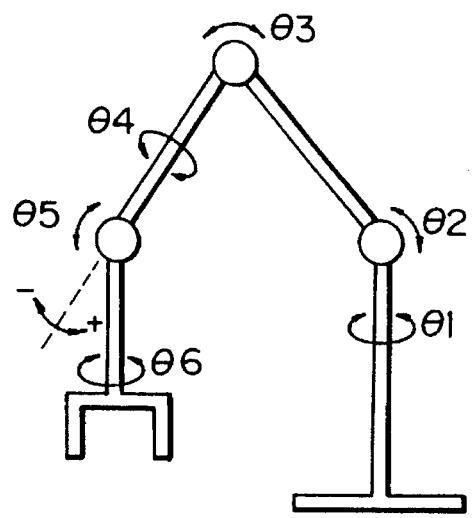
FIG. 9B is an illustrative view of an attitude mode of a manipulator when θ5 is positive.
Figure 10:
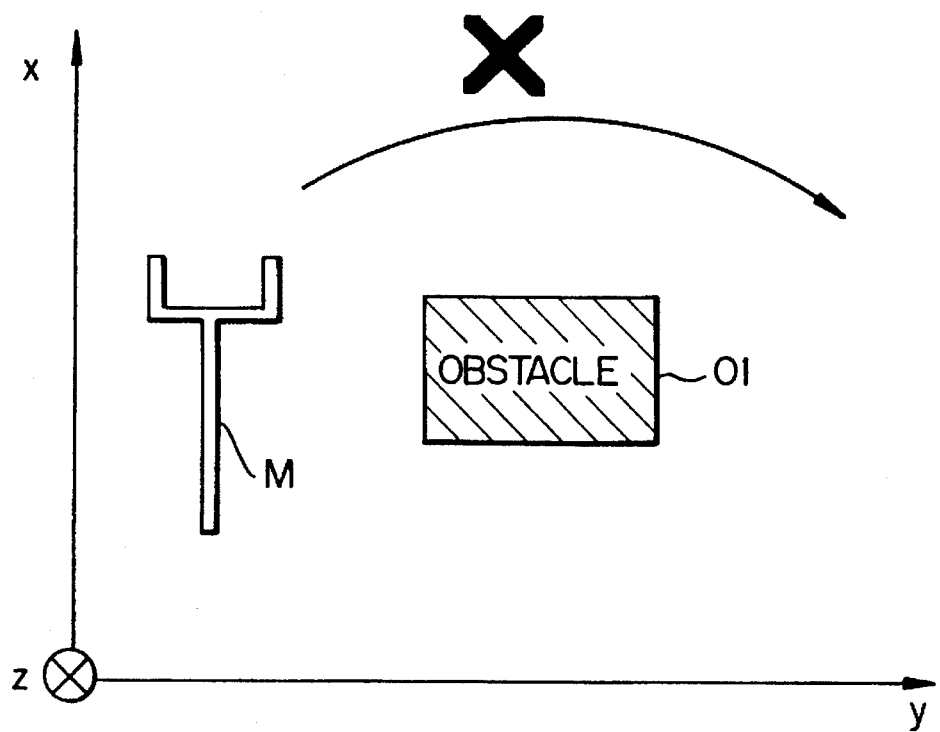
FIG. 10 is an illustrative view explaining a limiting process of a trajectory template

FIG. 9 is an example of an attitude mode "m" of a six-freedom vertical multi-articulation type manipulator M. FIG. 9 shows two attitude modes m1 and m2 respectively corresponding to positive and negative turns of a fifth shaft (a fifth articulation, $\theta 5$). In the attitude mode m1, when a positional relationship between the manipulator M and the obstacle O1 detected by the obstacle detecting section 45 is designated by a positional relationship shown in FIG. 10, then it is determined that the trajectory templates T7, T8, and T9 of group 3 which avoid the obstacle O1 by passing in front of (a positive direction on "x" coordinate) the obstacle O1 are unable to be used.

This is because, in the trajectory templates T7, T8, and T9, it is possible to avoid a collision of the manipulator M head with the obstacle O1, but it is not possible to avoid a collision of a manipulator M link with the obstacle 1. For the same reason, in this case, it is determined that the trajectory templates T10 and T11 of group 4 are also unable to be used.

Figure 11:
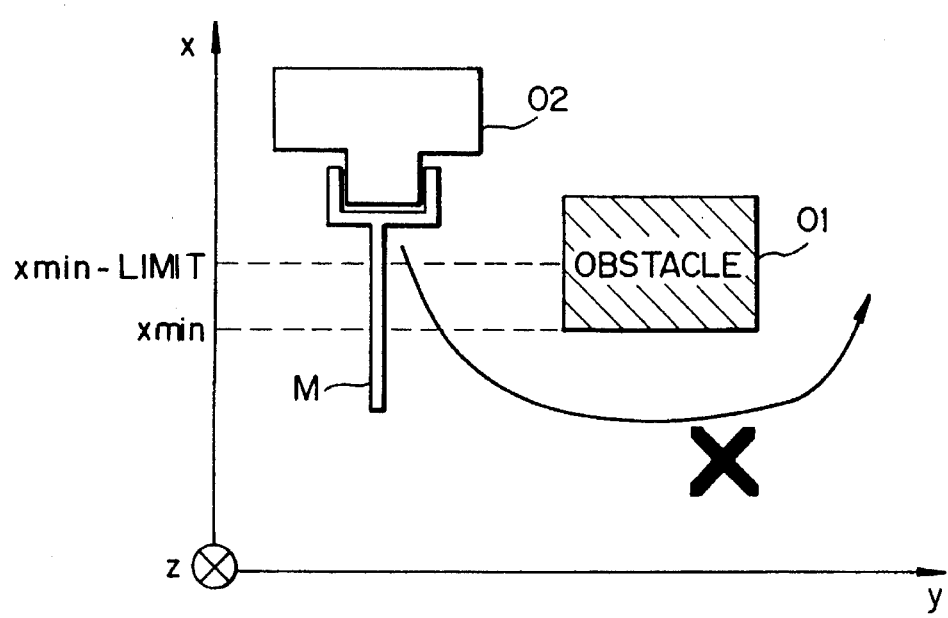
FIG. 11 is an illustrative view explaining a limiting process of a trajectory template T.

As shown in FIG. 11, when a minimum working limit xmin-limit in the "x" direction of the manipulator M (when holding the object O2, a size of the held object O2 is considered) is larger than a minimum value xmin in the "x" direction of the obstacle O1, then it is determined that the trajectory templates T4, T5, and T6 of group 2 which avoid the obstacle O1 by passing behind (a negative direction on "x" coordinate) the obstacle O1 are unable to be used.

Figure 12:
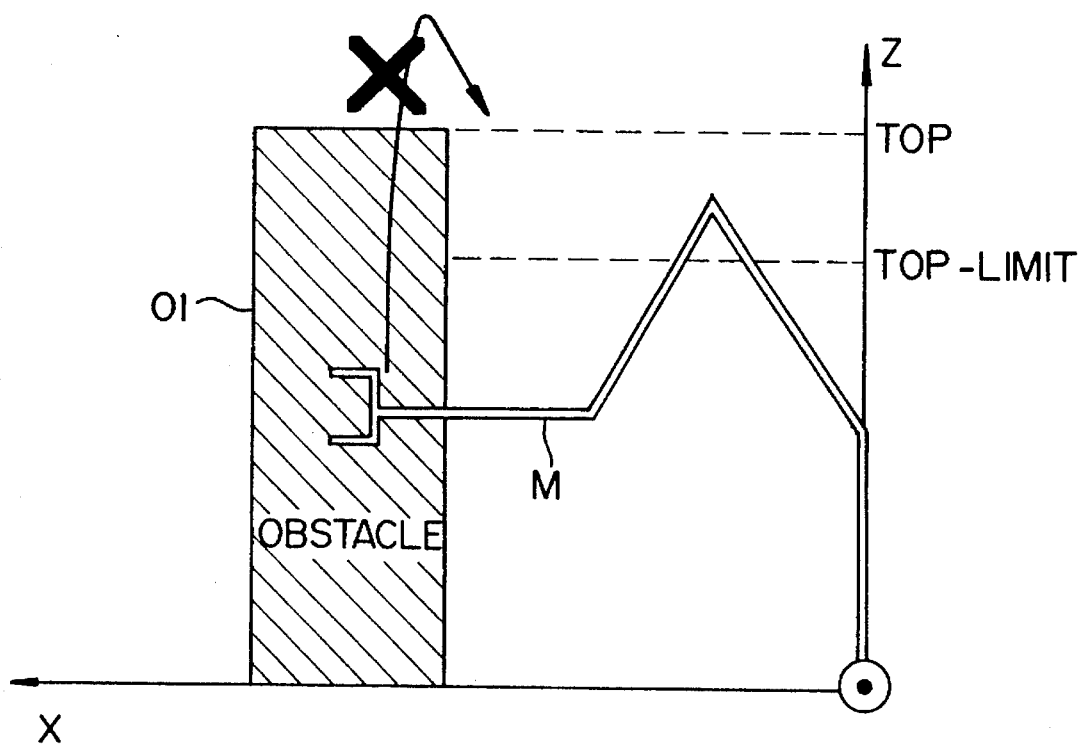
FIG. 12 is an illustrative view explaining a limiting process of a trajectory template T.

Further, as shown in FIG. 12, when a maximum working limit top-limit in the "z" direction of the manipulator M (when holding the object O2, a size of the held object O2 is considered) is smaller than a maximum value top in the "z" direction of the obstacle O1, then it is determined that the trajectory templates T1, T2, and T3 of group 1 which avoid the obstacle O1 by passing above (a positive direction on "z" coordinate) the obstacle O1 are unable to be used.

Figure 13:
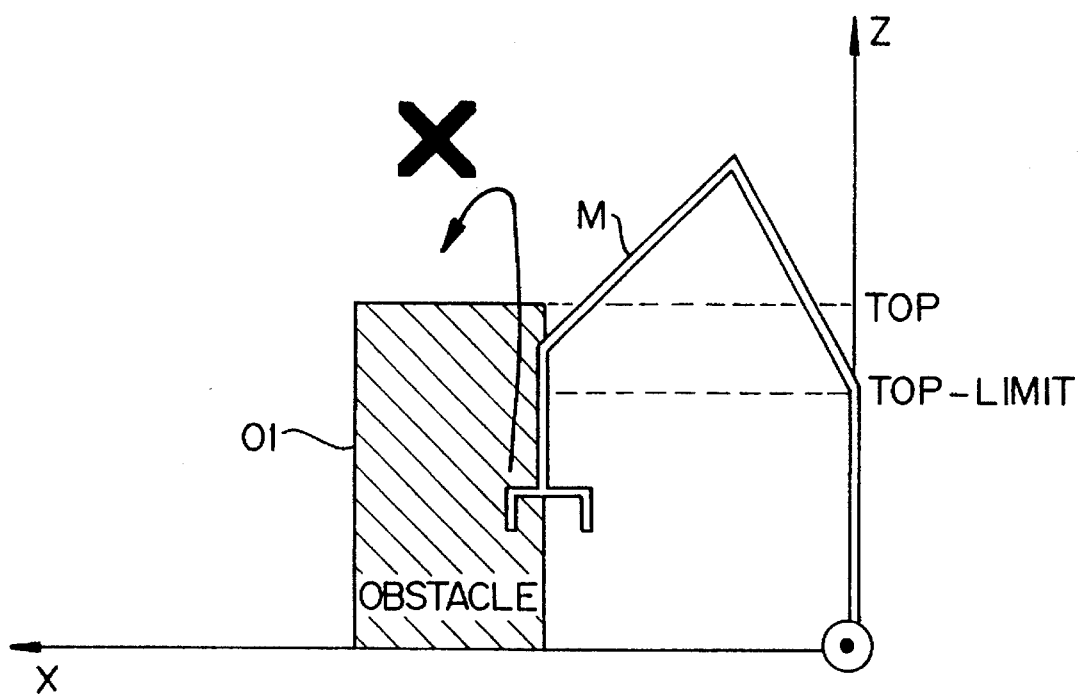
FIG. 13 is an illustrative view explaining a limiting process of a trajectory template T.
Figure 14:
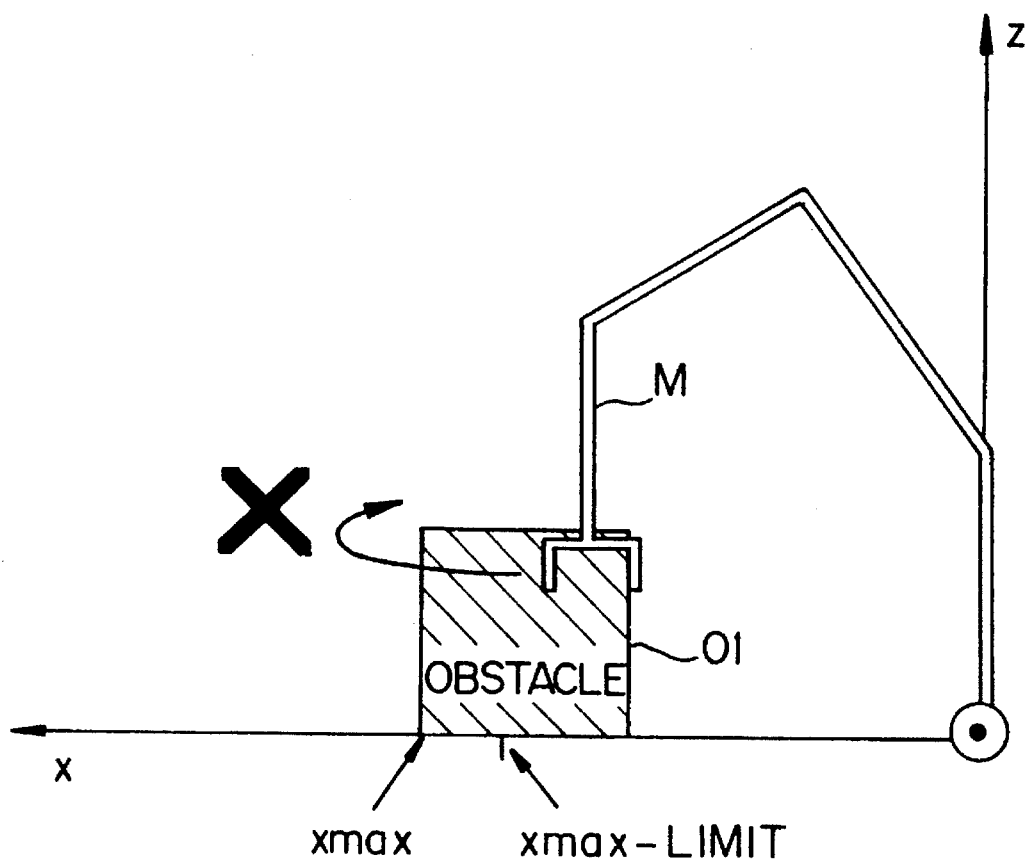
FIG. 14 is an illustrative view explaining a limiting process of a trajectory template T.
Figure 15:
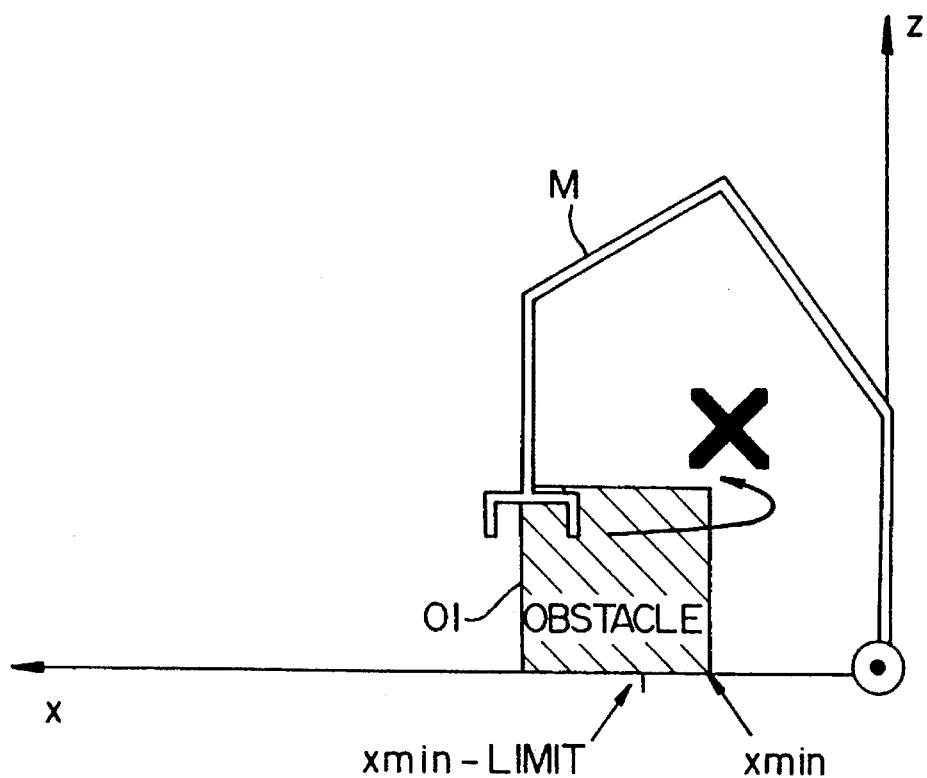
FIG. 15 is an illustrative view explaining a limiting process of a trajectory template T.

In the same manner, in the attitude mode m2, although details will be omitted, the trajectory template T which can be used is limited by positional relationships between top-limit, xmax-limit, xmin-limit and top, xmax, and xmin as shown in FIGS. 13 to 15. In this way, the unavailable trajectory template T is previously excluded from an object to be retrieved, and thus an effective retrieval can be carried out, based on the positional relationship between the obstacle O1 and the manipulator M and based on the attitude mode "m" of the manipulator M.

The priority order granting section 49 grants a priority order based on the execution environment, to the trajectory template T which is determined as available by the template limiting section 48. The priority order granting section 49 grants the priority order to the trajectory templates T first by evaluating the execution environment and next by granting a point to the respective trajectory templates T on the basis of a result of such evaluation.

The evaluation of the execution environment is carried out so that positional relationships between the starting point S, the end point E, and the obstacle O1 are determined. The positional relationships between the starting point S, the end point E, and the obstacle O1 are determined in a manner so as to be separated into a positional relationship on an xy plane and a positional relationship on a zy plane.

The positional relationship on the xy plane is determined by projecting the execution environment on the xy plane. In this decision process, in FIG. 16, the positional relationship is determined depending on whether "x" coordinates of the starting point S and the end point E are respectively larger than the maximum value xmax or smaller than the minimum value xmin each in the "x" direction of the obstacle O1 or whether or not such "x" coordinates are between the maximum xmax and minimum xmin. In such a separation of cases, the starting point S and the end point E each are considered to have three positional relationships, combinations of which therefore come to nine positional relationships as shown by (1) to (9).

Figure 17:
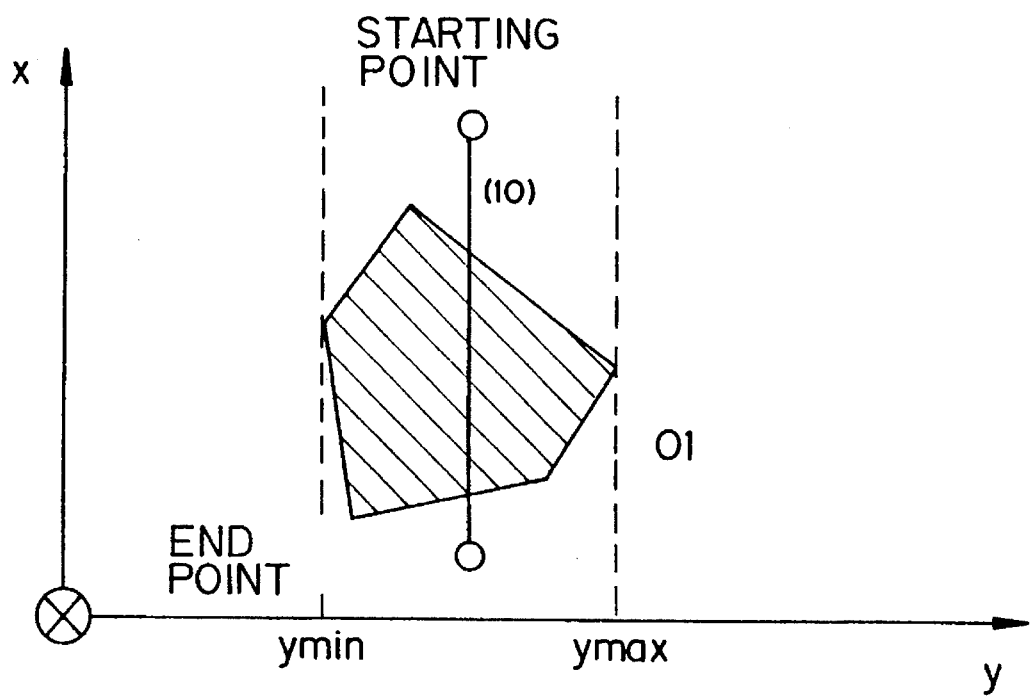
FIG. 17 is an illustrative view of an environment evaluation process on the xy plane explaining a positional relationship of the starting point and end point.

For a decision of the positional relationship on the xy plane, the decision is made regarding not only the positional relationship in the "x" direction as described above but also the positional relationship in the "y" direction in FIG. 17. In other words, a decision is made for a positional relationship (10) which satisfies the condition where the "y" coordinates of the starting point S and the end point E are both between the maximum value ymax and the minimum value ymin in the "y" direction.

On the xy plane, through separation into ten cases as described above, the positional relationships are determined. The positional relationships (1) and (9) in which the straight trajectory n are not overlapped with the obstacle O1 are included in an object to be evaluated. The reason therefor is that even in such a case there may arise a possibility of overlapping the cube C with the obstacle O1 if the cube C is used instead of the straight trajectory L.

Figure 18:
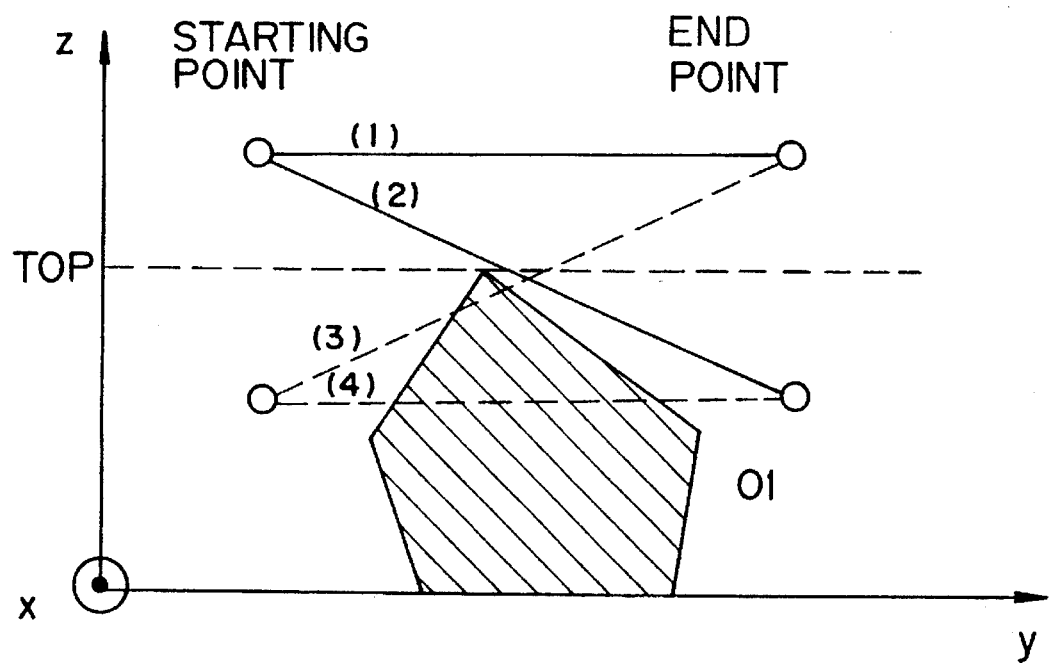
FIG. 18 is an illustrative view of an environment evaluation process on the zy plane explaining a positional relationship of the starting point and end point.
Figure 20B:
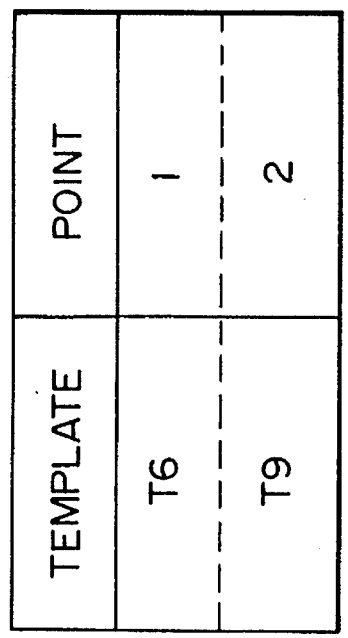
FIG. 20B is an illustrative view showing a number of templates and assigned points thereof in FIG. 20A.
Figure 20A:
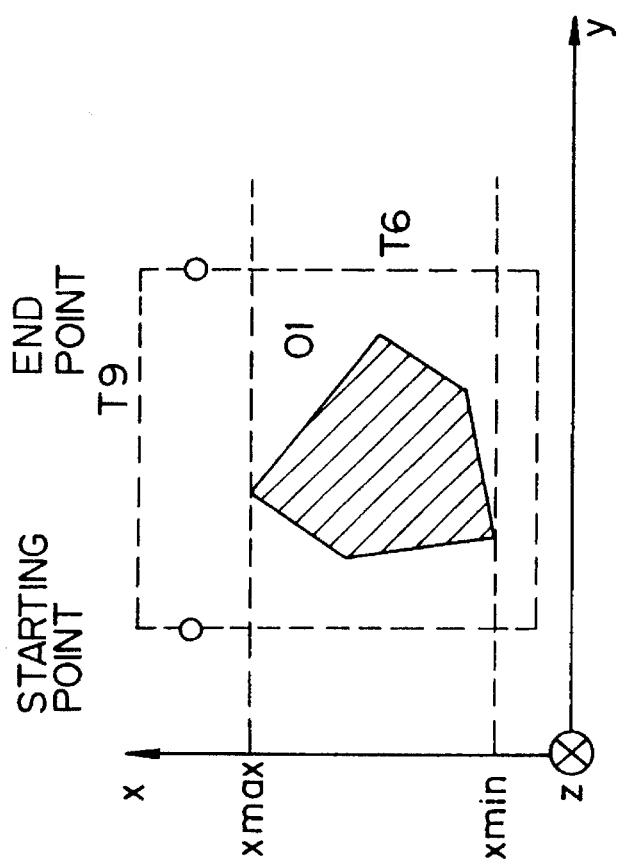
FIG. 20A is an illustrative view of the first example of an environment evaluation process on the xy plane.
Figures 21A, 21B:
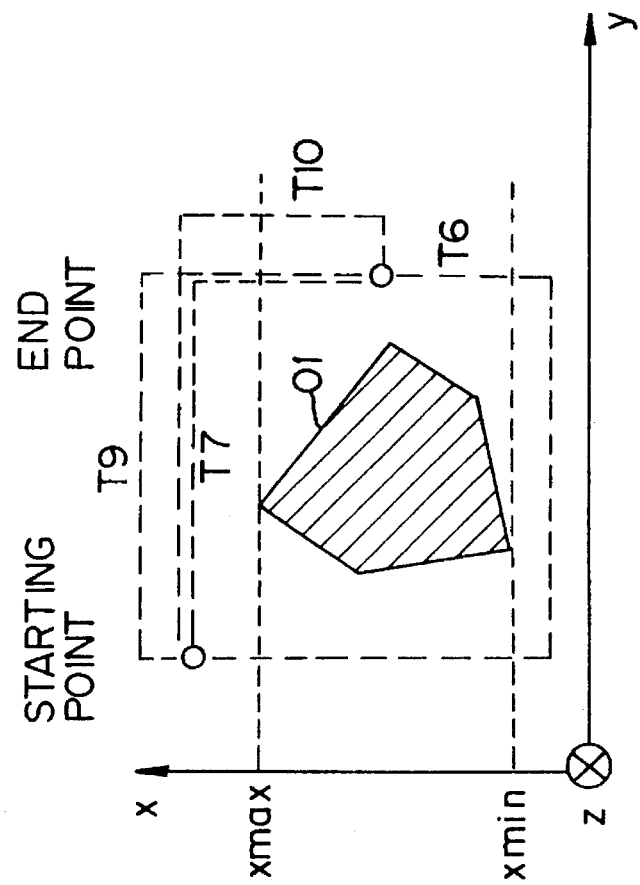
FIG. 21A is an illustrative view of the second example of an environment evaluation process on the xy plane.
FIG. 21B is an illustrative view showing a number of templates and assigned points thereof in FIG. 21A.

For the positional relationship on the zy plane, similarly a decision is made by projecting the execution environment on the zy plane, which is shown in FIG. 18. In the above case a positional relationship is determined as to whether or not "z" coordinates of the starting point S and the end point E are respectively larger than the maximum value of the top of the obstacle O1. In this separation, the starting point S and the end point E are each considered to have two cases, combinations of which therefore come to four positional relationships (1) to (4).

The execution environment is thus evaluated by the positional relationships between the starting point S, the end point E, and the obstacle O1, the positional relationships of which are determined by separating them into those on the xy plane and on the yz plane. Based on a result of the evaluation, an algorithm for granting the priority order to the respective trajectory templates T is exemplified as follows;

(1) First, the positional relationship on the xy plane is determined, and a point is assigned to each trajectory template T based on such determination (the weight of the point is determined, for example, in accordance with the distance between the start and end points along with the trajectory of the manipulator-head);

(2) Next, the positional relationship on the yz plane is determined, and a point is assigned to each trajectory template T based on such determination; and (3) Finally, points of each trajectory template T are summarized, and an order of the priority order is determined sequentially from those having higher sums.

A reference of the points assigned to the respective trajectory templates T is shown in FIG. 19, where a maximum value of points to be assigned at a time is three in this embodiment. Note, the point of the trajectory plate T is initialized to "0" before starting the evaluation of the environment. When assigning the points, first the effective trajectory template T is determined based on the positional relationship which has been determined. Next, a moving distance (length) of the trajectory template T thus determined is calculated. This calculation is carried out based on positional information of the relaying point R of the trajectory template T registered in the template storage 43. Finally, based on the calculated result, a higher point is applied sequentially from those having a shorter moving distance.

Figures 29A, 29B:
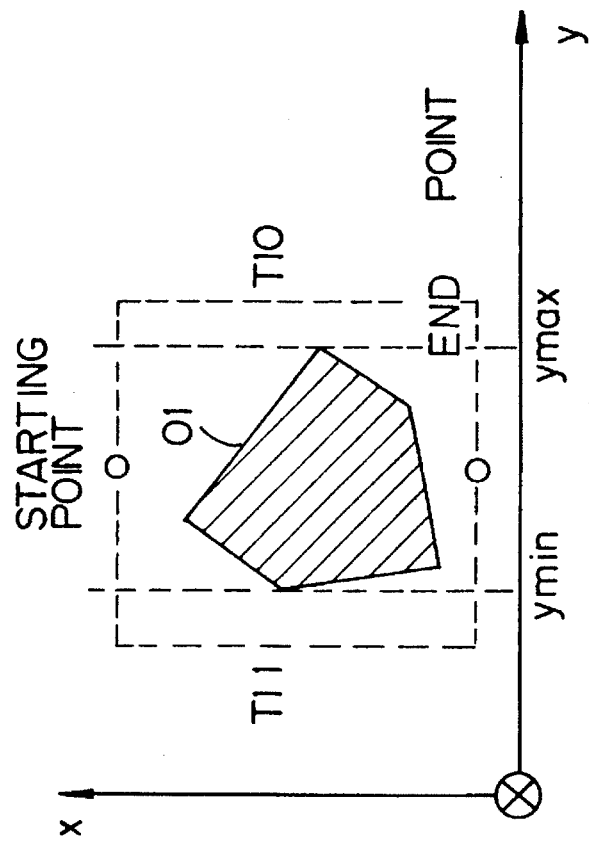
FIG. 29A is an illustrative view of the tenth example of an environment evaluation process on the xy plane.
FIG. 29B is an illustrative view showing a number of templates and assigned points thereof in FIG. 29A.

The points assigned in such a way are shown in FIGS. 20 to 33. FIGS. 20 to 28 designate the points in the positional relationships (1) to (9) in the "x" direction on the xy plane shown in FIG. 16. FIG. 29 shows the points in the positional relationship (10) in the "y" direction on the yz plane in FIG. 17. FIGS. 30 to 33 designate the points in the positional relationships (1) to (4) in the "z" direction on the yz plane in FIG. 18.

Figure 16:
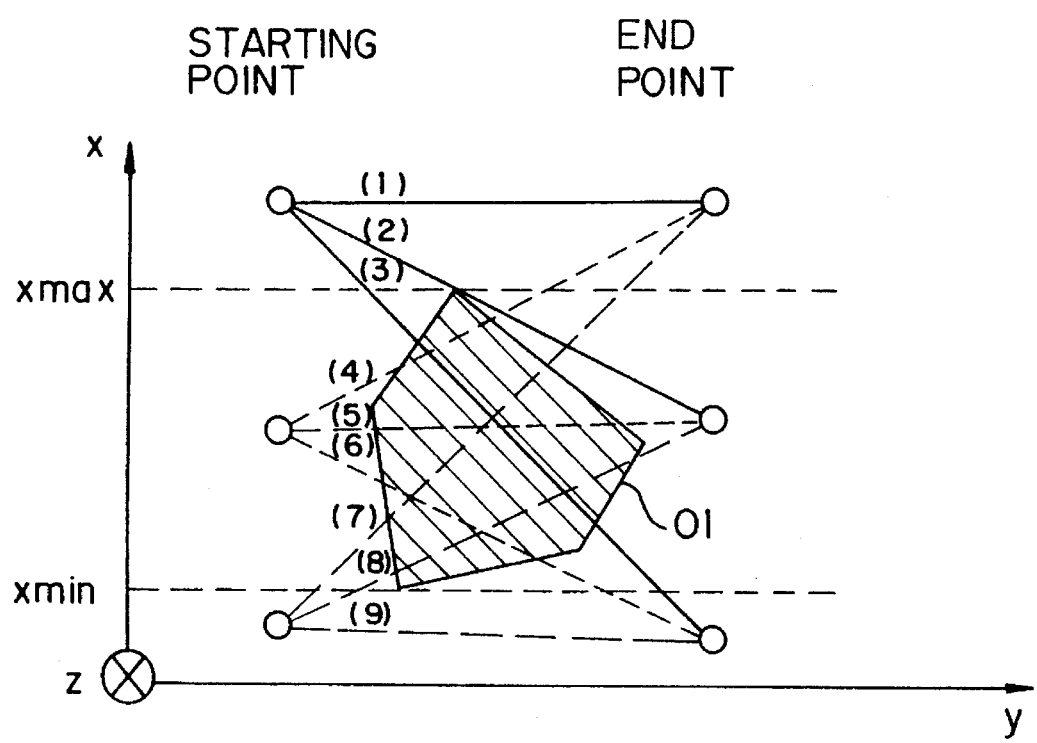
FIG. 16 is an illustrative view of an environment evaluation process on the xy plane explaining a positional relationship of the starting point and end point.

The priority order grant algorithm as described above will be described with reference to a representative example where a positional relationship in the "x" direction on the xy plane has a relationship shown in FIG. 16 (3), a positional relationship in the "y" direction on the same plane has a relationship in FIG. 17 (10), and a positional relationship in the "z" direction on the yz plane has a relationship in FIG. 18.

Figures 22A, 22B:
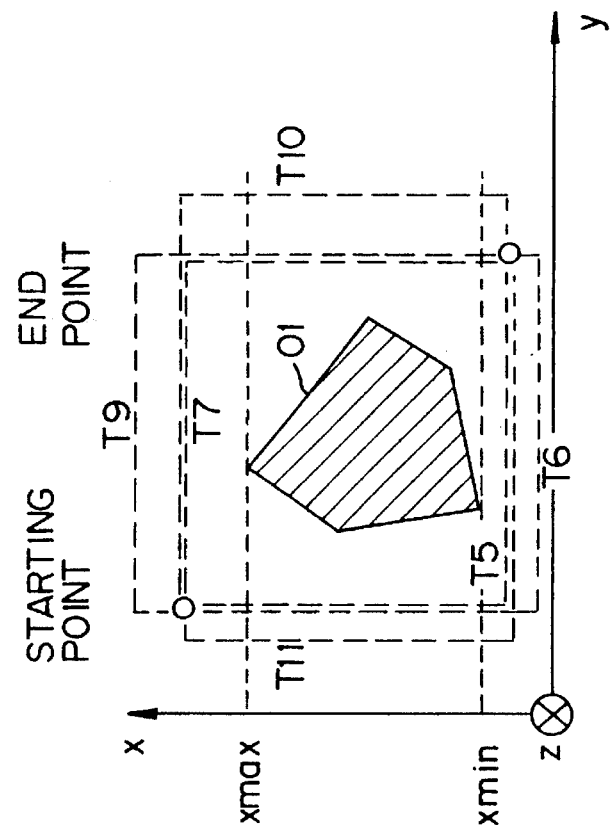
FIG. 22A is an illustrative view of the third example of an environment evaluation process on the xy plane.
FIG. 22B is an illustrative view showing a number of templates and assigned points thereof in FIG. 22A.
Figures 23A, 23B:
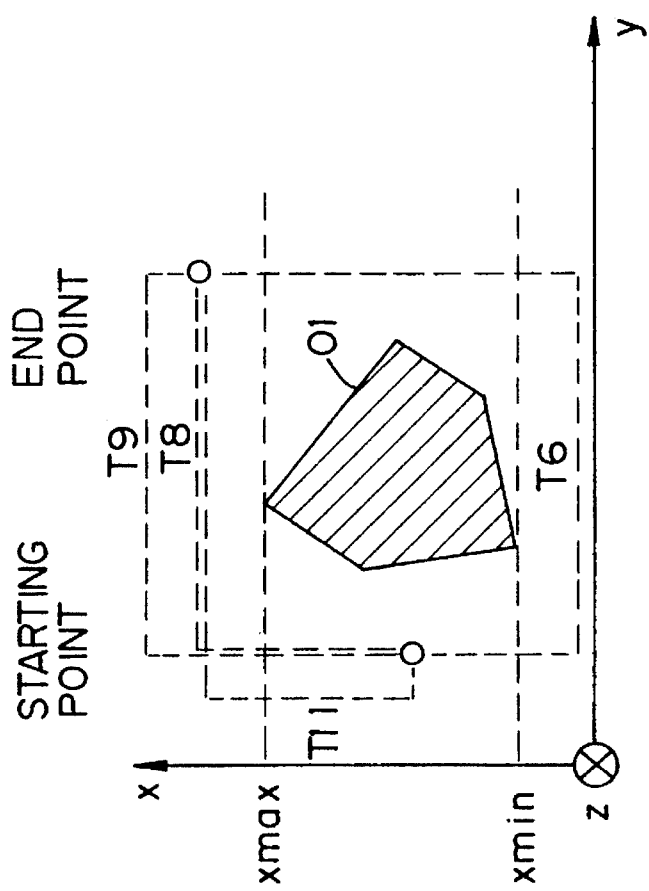
FIG. 23A is an illustrative view of the fourth example of an environment evaluation process on the xy plane.
FIG. 23B is an illustrative view showing a number of templates and assigned points thereof in FIG. 23A.
Figure 24A:
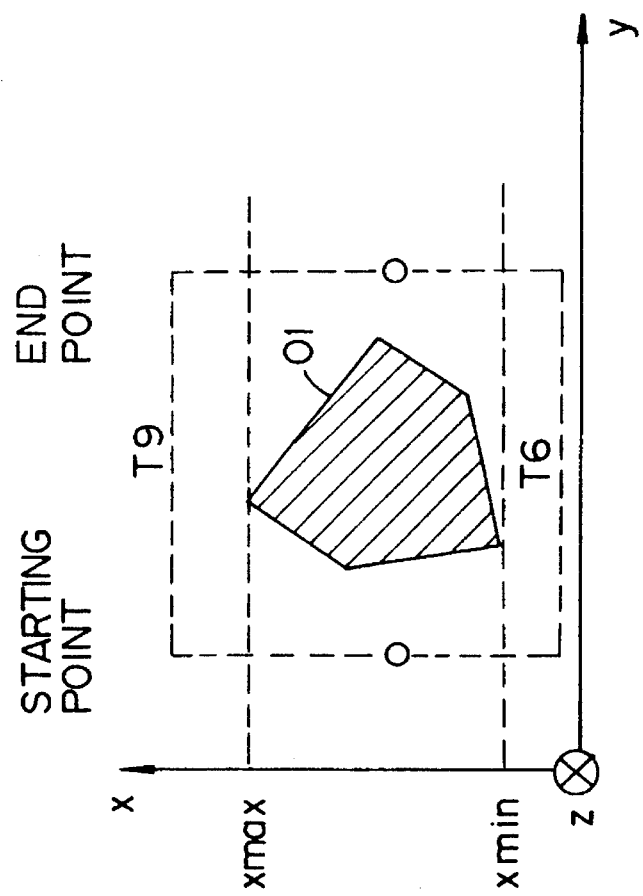
FIG. 24A is an illustrative view of the fifth example of an environment evaluation process on the xy plane.
Figure 24B:
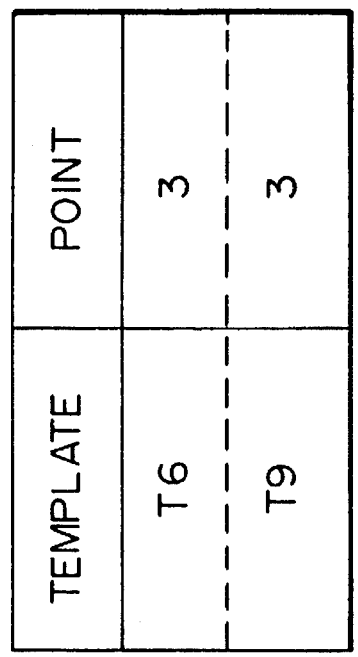
FIG. 24B is an illustrative view showing a number of templates and assigned points thereof in FIG. 24A.
Figures 25A, 25B:
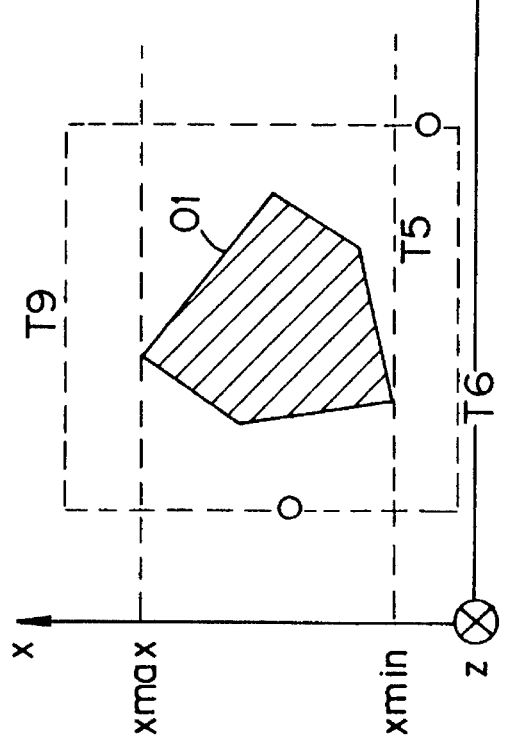
FIG. 25A is an illustrative view of the sixth example of an environment evaluation process on the xy plane.
FIG. 25B is an illustrative view showing a number of templates and assigned points thereof in FIG. 25A.
Figures 26A, 26B:
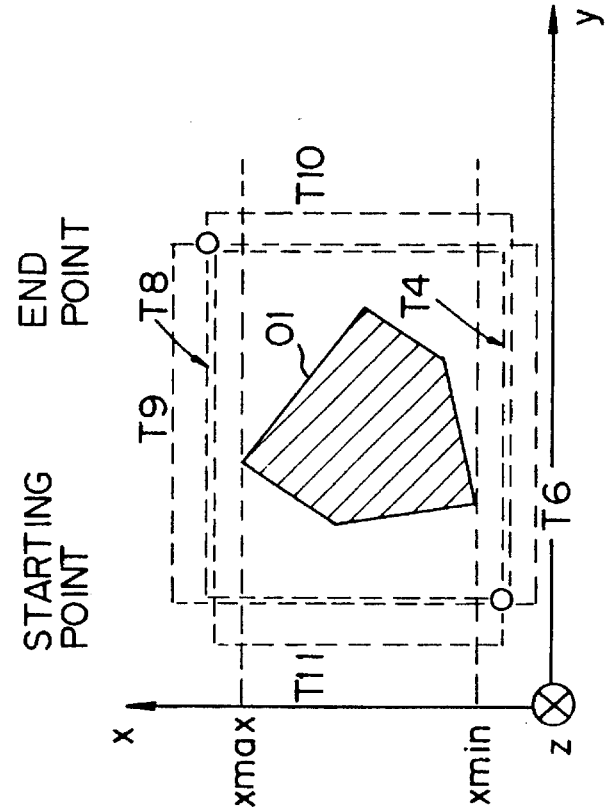
FIG. 26A is an illustrative view Of the seventh example of an environment evaluation process on the xy plane.
FIG. 26B is an illustrative view showing a number of templates and assigned points thereof in FIG. 26A.
Figures 27A, 27B:
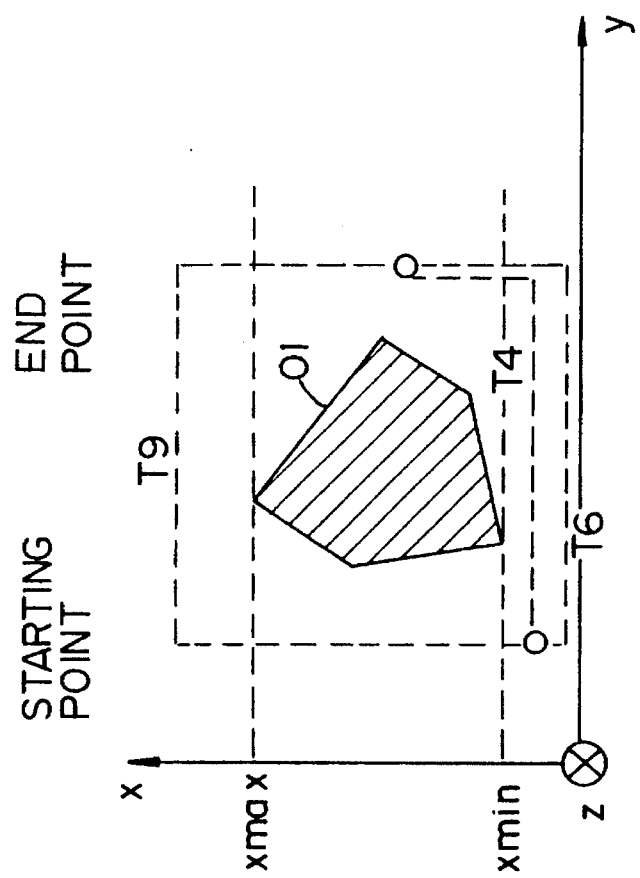
FIG. 27A is an illustrative view of the eighth example of an environment evaluation process on the xy plane.
FIG. 27B is an illustrative view showing a number of templates and assigned points thereof in FIG. 27A.
Figure 28B:
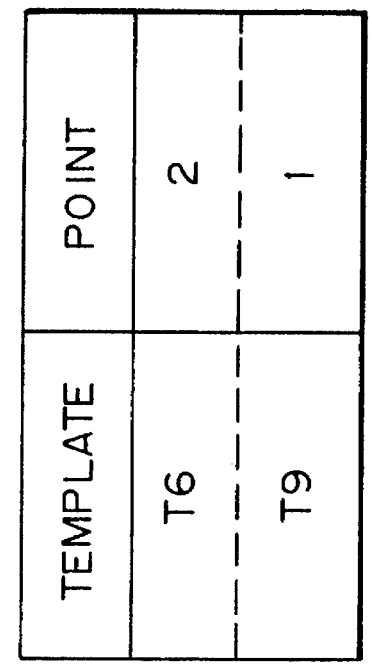
FIG. 28B is an illustrative view showing a number of templates and assigned points thereof in FIG. 28A.
Figure 28A:
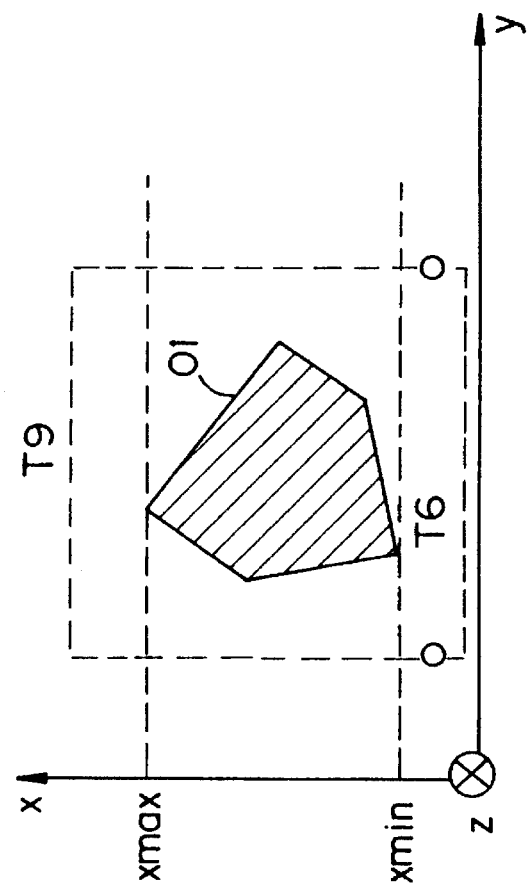
FIG. 28A is an illustrative view of the nineth example of an environment evaluation process on the xy plane.

For the positional relationship (3) in the "x" direction on the xy plane, the trajectory templates T5, T6, T7, T9, T10, and T11 are determined as available as shown in FIG. 22. Accordingly, the points are assigned for the trajectory templates T5, T6, T7, T9, T10, and T11 on the basis of the moving distance calculated from the positional information of the relaying point R registered in the template register memory 41.

For the positional relationship (10) in the "y" direction on the xy plane, the trajectory templates T10 and T11 are determined as available as shown in FIG. 29.

Accordingly, the points are assigned for the trajectory templates T10 and T11 on the basis of the moving distance thereof.

Figures 30A, 30B:
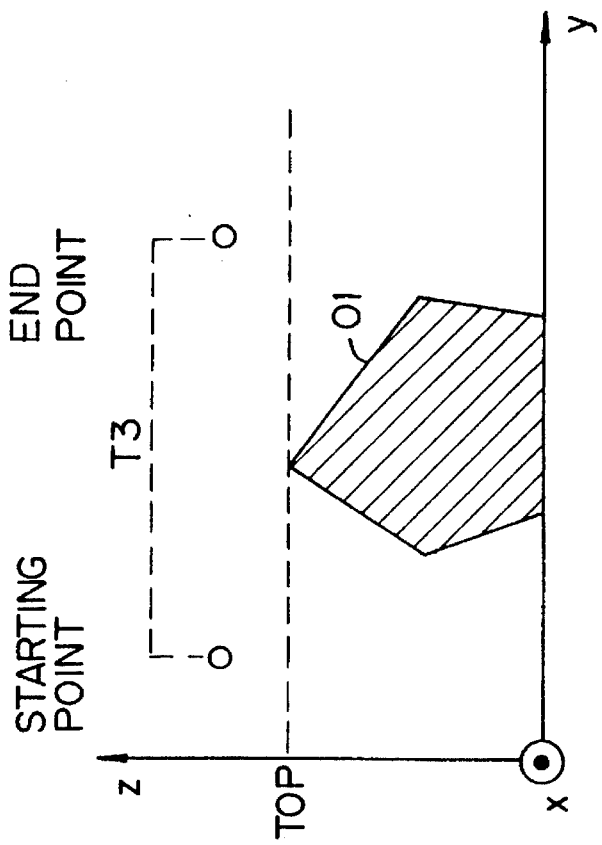
FIG. 30A is an illustrative view Of the first example of an environment evaluation process on the zy plane.
FIG. 30B is an illustrative view showing a number of template and assigned points thereof in FIG. 30A.
Figure 31B:
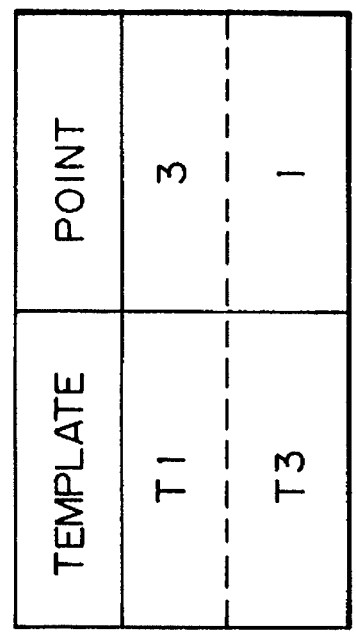
FIG. 31B is an illustrative view showing a number of templates and assigned points thereof in FIG. 31A.
Figure 31A:
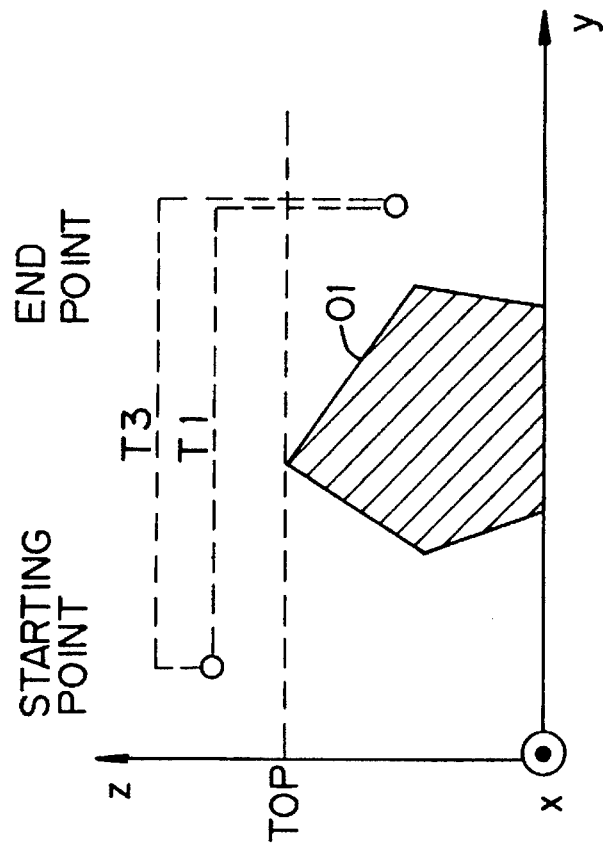
FIG. 31A is an illustrative view of the second example of an environment evaluation process on the zy plane.
Figure 32B:
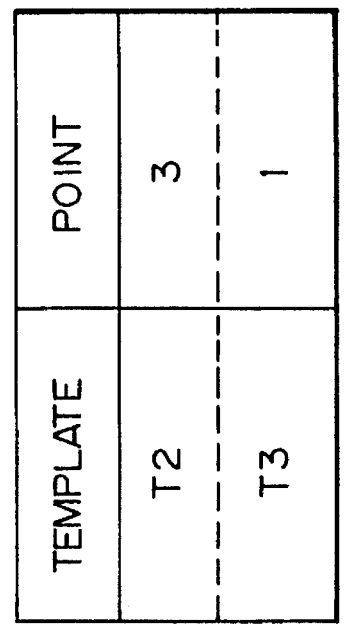
FIG. 32B is an illustrative view showing a number of templates and assigned points thereof in FIG. 32A.
Figure 32A:
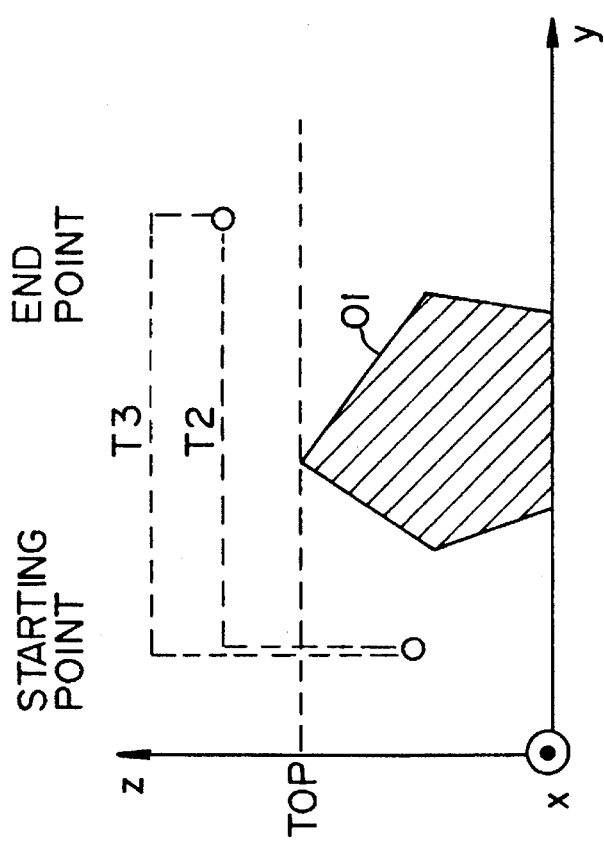
FIG. 32A is an illustrative view of the third example of an environment evaluation process on the zy plane.
Figure 33A:
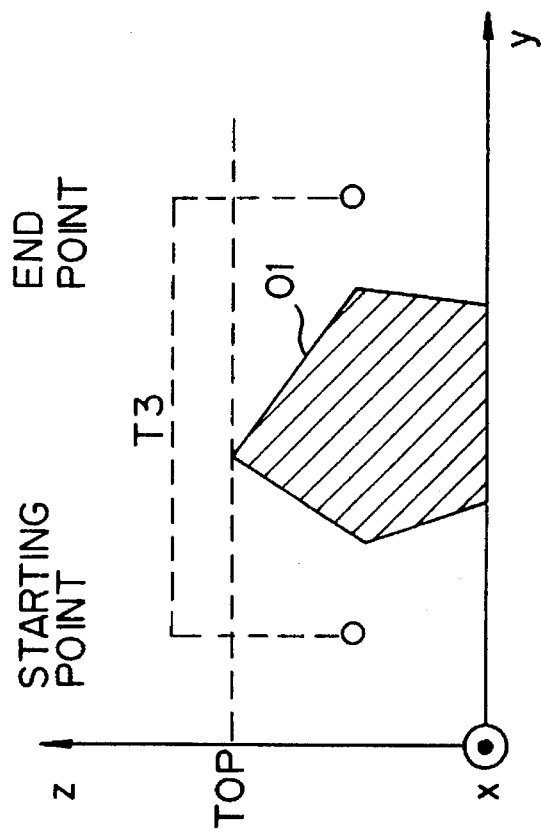
FIG. 33A is an illustrative view of the fourth example of an environment evaluation process on the zy plane.
Figure 33B:
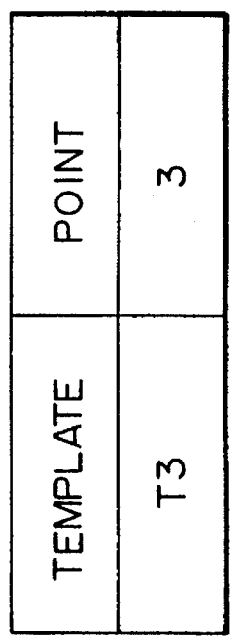
FIG. 33B is an illustrative view showing a number of template and assigned points thereof in FIG. 33A.

For the positional relationship (1) in the "z" direction on the zy plane, the trajectory template T3 is determined as available as shown in FIG. 30. Accordingly, the point is assigned for the trajectory template T3 on the basis of the moving distance thereof.

The assignments of the points to the respective directions are terminated as above, then the operation proceeds to a process of summarizing the points. In the calculating process, the points of the trajectory templates T3, T5, T6, T7, and T9 are not varied, however, the points of the trajectory templates T10 and T11 are varied respectively from 3 to 4. In the assignments of the points as described above, the trajectory templates T having the same points are present at certain times.

In such a case, for example, the trajectory templates T having a smaller template number have priority over those having the larger template number. In this way, the priority order for the trajectory templates T3, T5, T6, T7, T9, T10, and T11 is varied to the order of T10→T11→T5→T7→T3→T6→T9.

Here, a function of the first interference inspecting section 50 is explained in detail. The first interference inspecting section 50 inspects an interference of the trajectory template T with the obstacle O1 on the environment model in a process in which the trajectory template T is read from the template storage 42 in the order of a higher priority order on the basis of the priority order assigned by the priority order assigning section 49. In the interference inspection, it is a matter of course that the interference with the obstacle O1 detected by the obstacle detecting section 45 is inspected. But, interferences with the other obstacles therearound are also detected, and these other obstacles are designated also by the same numeral O1 other than at the time of a requirement to distinguish them from O1. The size of the trajectory template T is set based on the size of the obstacle O1 detected by the obstacle detecting section 45 as described above. Accordingly, in the interference inspection described, it becomes significant to inspect the interference with the obstacle O1. When the interference is generated in the above interference inspection, the first interference inspecting section 50 reads, from the template storage 43, the trajectory template T of the next priority order and again executes the interference inspection.

Figure 34:
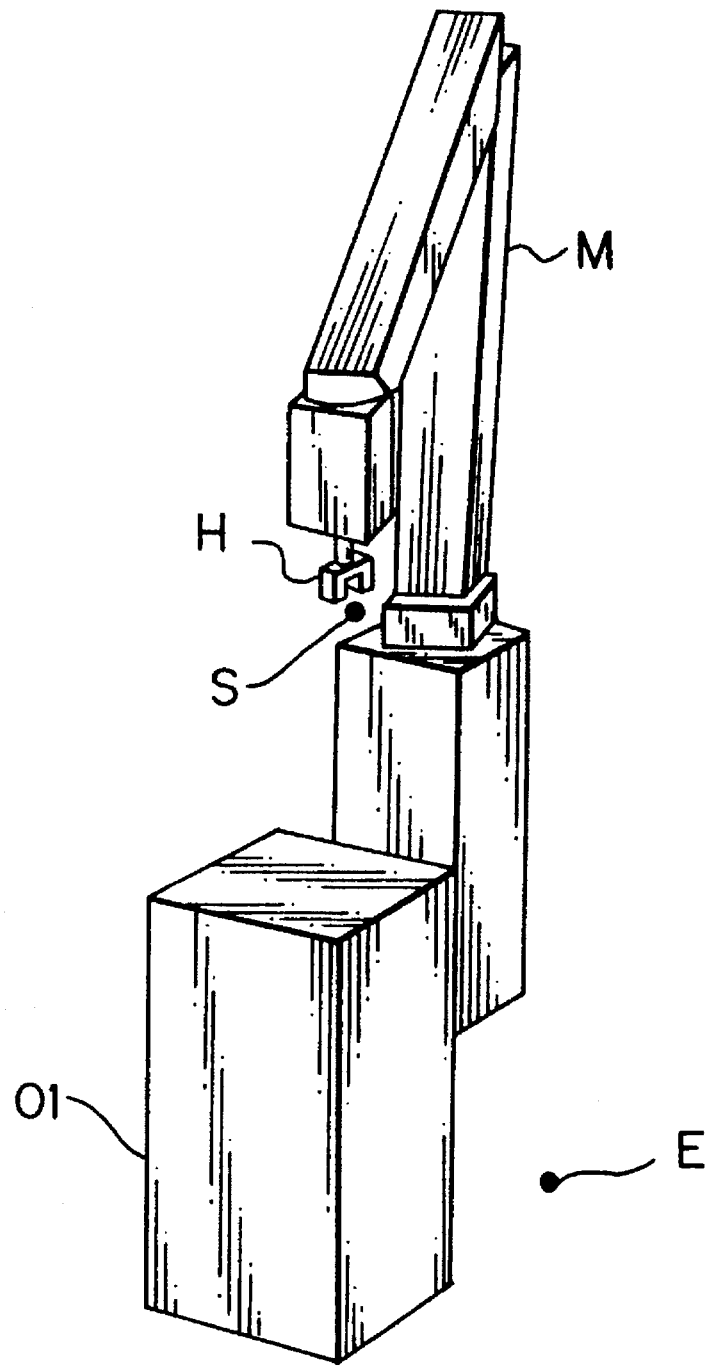
FIG. 34 is a perspective view of the manipulator assigned the starting point and the end point of the head thereof, and the obstacle.
Figure 35:
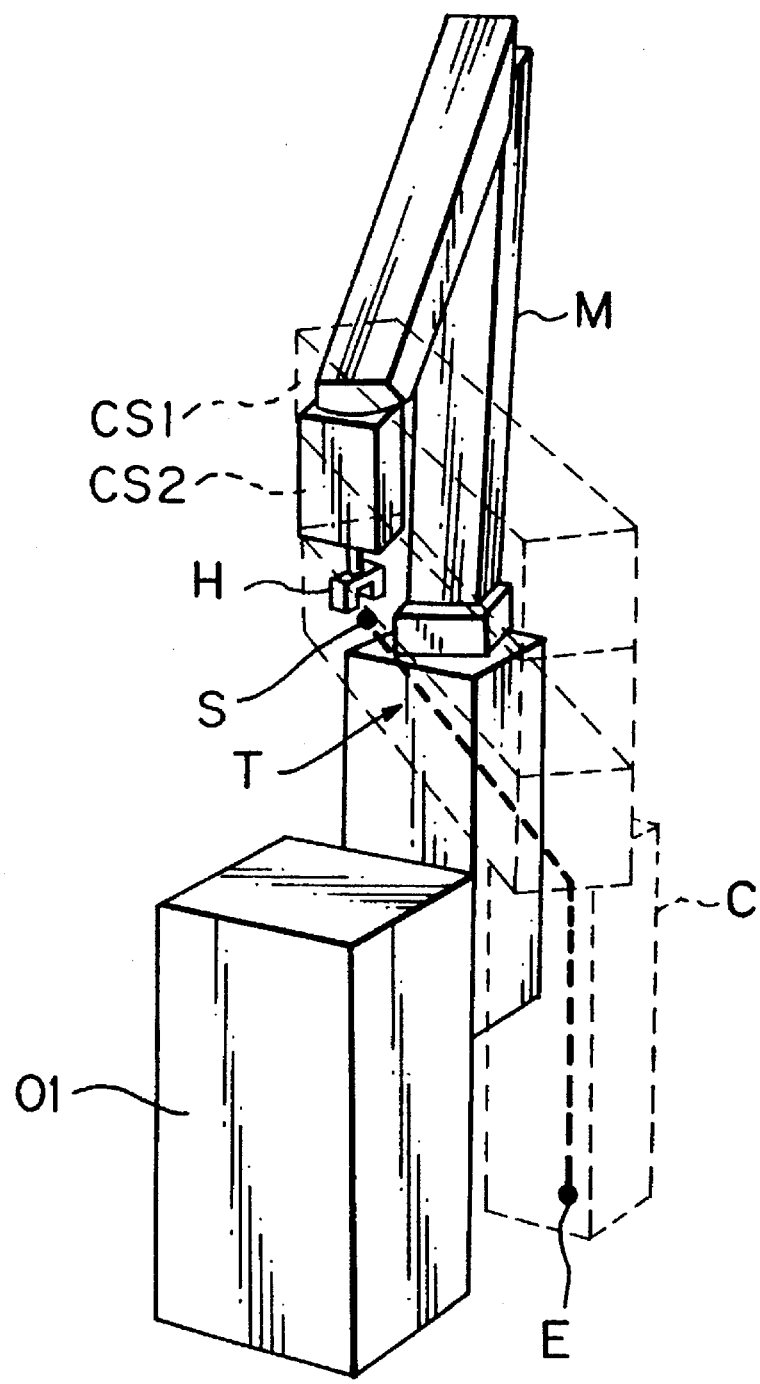
FIG. 35 is an illustrative view explaining an interference inspection process of a trajectory template and an obstacle.

A process of the interference inspection is shown in FIGS. 34 and 35. In FIG. 34, M denotes a manipulator. H denotes a head of the manipulator M, O1 denote an obstacle, S denotes a start point of the head M, and E denotes an end point of the head H. As shown in FIG. 35, the trajectory template T is expressed as a set of cubes C, and its speed is increased by roughly inspecting an interference in an attitude direction by picturing two auxiliary cubes CS1 and CS2 also in the attitude direction of the manipulator M.

As a result of the interference inspection, the trajectory template T picked up by such detailed interference-inspection can previously be removed from an object to be retrieved, before the detailed interference-inspection is performed by a curve interpolation and a simulation which will hereinafter be described.

When the first interference inspecting section 50 determines that the interference is not generated, the curve interpolation section 51 produces the trajectory data of the manipulator M by interpolating the trajectory template T for which the above decision has been made on the environment model on the basis of an operational characteristic of the manipulator M. Then the second interference inspecting section 52 executes a detailed interference-inspection between the manipulator M and the obstacle O1 by performing a simulation on the environment model on the basis of the trajectory data produced by the curve interpolation section 51.

Figure 36:
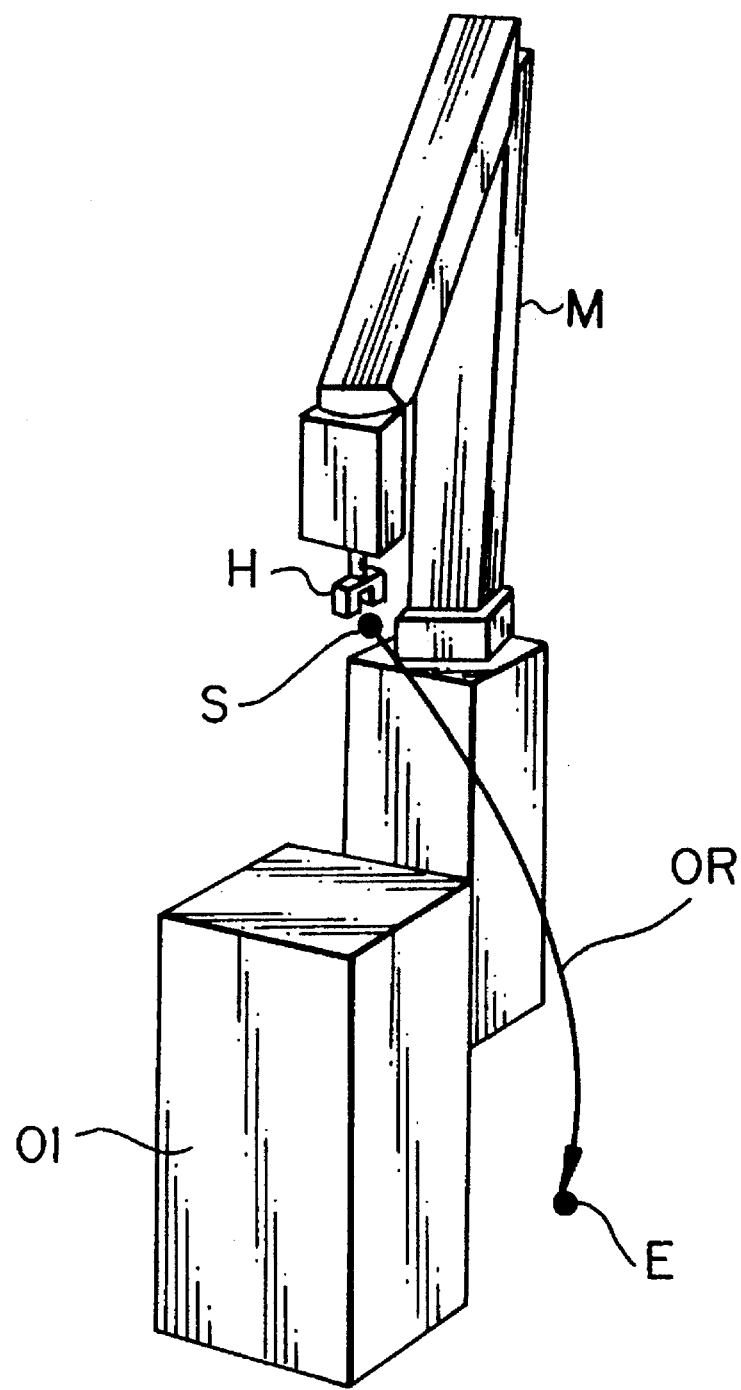
FIG. 36 is an illustrative view explaining a curve-interpolated trajectory of the manipulator-head according to the inspection process of a trajectory template and an obstacle.

FIG. 36 shows a curve-interpolated trajectory OR produced after the interference inspection process of the second interference inspecting section 52. These are the operations of the manipulator-head producing system 42 in FIG. 3B.

Figure 37A:
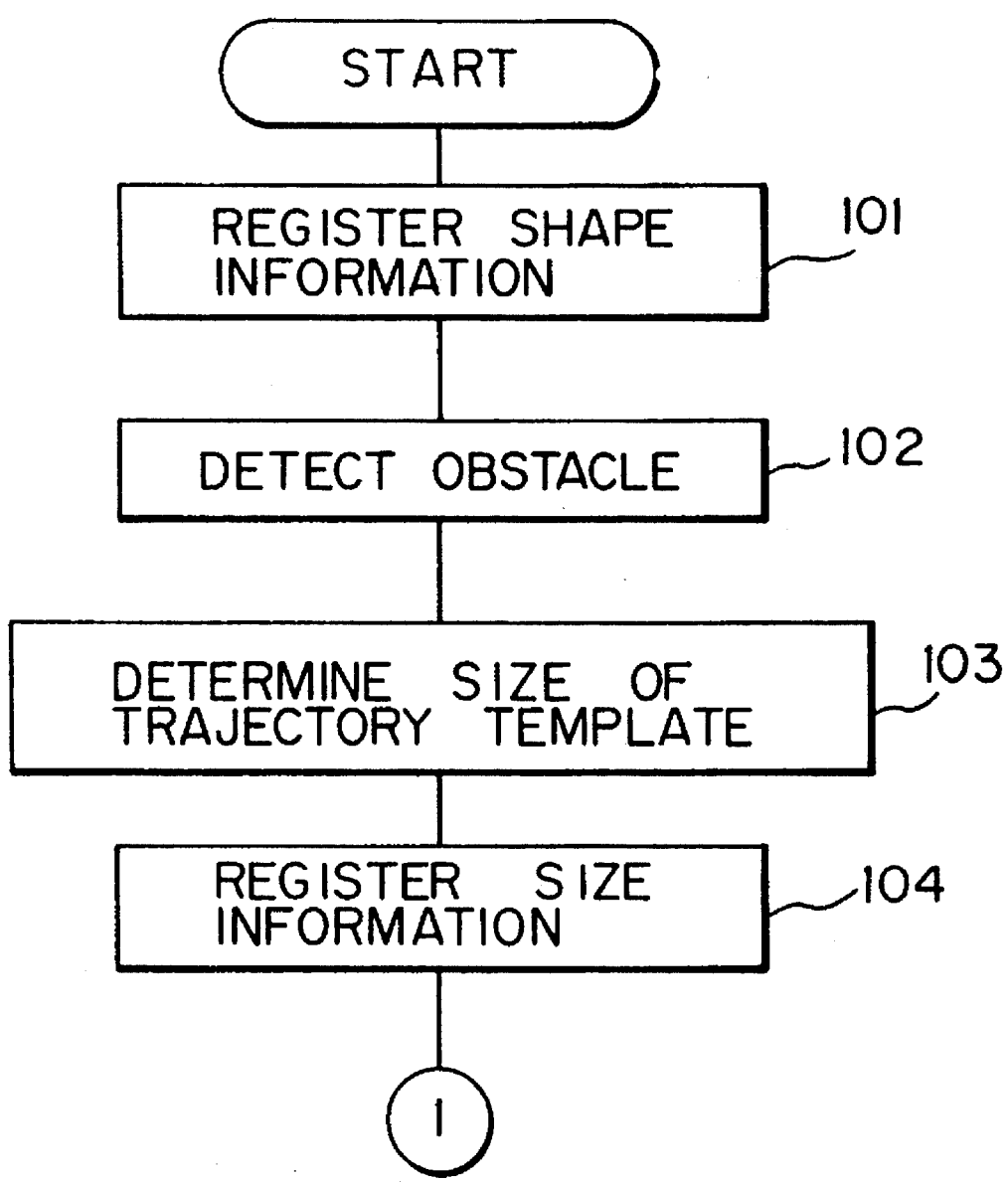
FIGS. 37A and 37B are flowcharts showing the operation of the automatic manipulator-head trajectory producing system of FIG. 3.

Respective functions shown in FIG. 3B are executed by software of a central processing unit (CPU), and in this connection operation of the system in FIG. 3B will be described with reference to flowcharts in FIGS. 37A and 37B. Assume that the environment model has already been registered in the environment model storage 41 in the following explanation.

The producing of the manipulator-head trajectory is executed by instructing a producing process of the manipulator-head trajectory by the operator. When the above instruction is received, a registering process of the trajectory template T is executed based on the environment model stored in the environment model storage 41 as shown in FIG. 37A (step 101 to step 104). At step 101, shape information of the trajectory templates T (T1 to T11) designating the head trajectories of manipulator M estimated by the shape register 44 is registered in the template storage 43.

Next at step 102, the obstacle O1 is detected on the environment model by the obstacle detecting section 45. Then a size of the trajectory template T is determined by the size decision section 46 at step 103, and the result of determination is written into the template storage 43 by the size register 47 at step 104. In this way, the registering process of the template T on the basis of the execution environment is terminated.

Figure 37B:
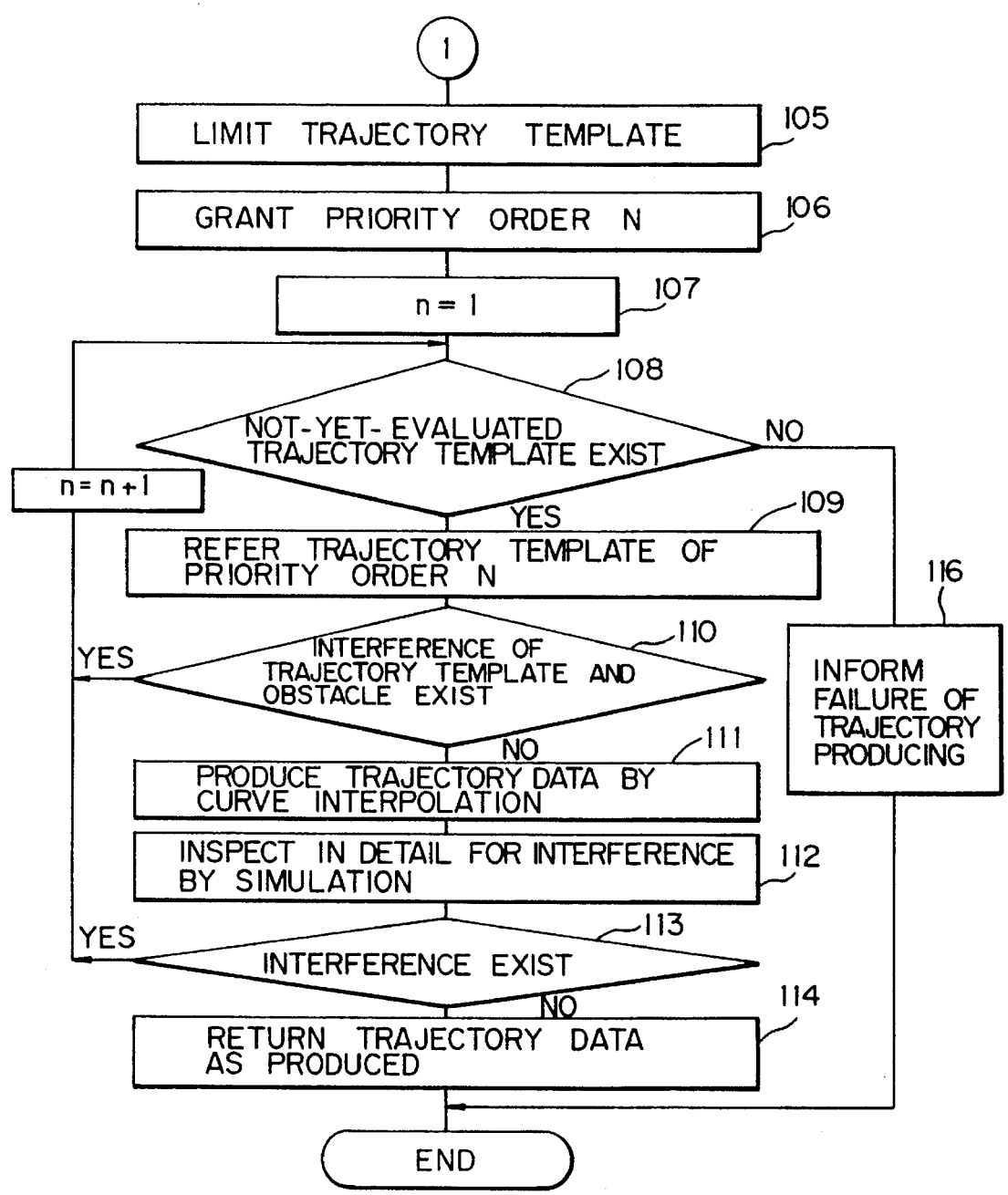

After the above-described process, the producing process of the manipulator-head trajectory is executed on the environment model as shown in FIG. 37B (steps 105 to 116). In the producing process of the manipulator-head trajectory, the usable trajectory templates T are limited based on the attitude mode "m" of the manipulator M by the template limiting section 48 at step 105. A number "n" of the priority order is assigned, by the priority order assigning section 49, for the trajectory template T the use of which is determined as available by the template limiting section 48 at step 106.

An interference of the trajectory template T having a highest priority order "n" (n=1) with the obstacle O1 is inspected by the first interference inspecting section 50 as shown in FIG. 37B at steps 107 to 110.

In this interference inspection, if it is determined that the interference is not generated at step 110, the control proceeds to step 111 and trajectory data are produced by interpolation through the curve interpolation section 51 with respect to the trajectory template T which is determined so that the interference is not generated. Then a simulation is executed by the second interference inspecting section 52 on the basis of the trajectory data, and a detailed interference-inspection of the manipulator M and the obstacle O1 is executed at step 112.

Through the interference inspection, if it is determined that the interference is not generated at step 113, the trajectory data described above is fed to an actual manipulator-driver (not shown) at step 114. On the other hand, if it is determined that the interference is present at step 110 or step 113, then the process as described above is again executed based on the trajectory template T of the next priority order "n" at step 115.

Following the above, the processes described are repeated until it is determined that the interference is not generated. If the interference is not generated even in the trajectory template T of the lowest priority order, then a failure to produce the trajectory is informed to the operator at step 116.

According to the embodiments as hereinbefore described in detail, advantages are as follows:

(1) Since the template storage 43 as a memory is enough to register the trajectory template T, a capacity of the memory can be reduced compared to registering of a mesh;

(2) The manipulator-head trajectory is produced by previously estimating the head trajectory and by inspecting as to whether such estimation is correct or not. Accordingly, a time required for the producing process of the manipulator-head trajectory can be reduced compared to the case where the manipulator-head trajectory is researched using the mesh;

(3) A size of the trajectory template T (such as a world position of the relaying point R or a width W of the cube C) is determined based on the size of the obstacle O1 and the held object O2. Therefore, the number of the trajectory templates T to be previously prepared can largely be reduced, thus an effective retrieval for the trajectory template T can be realized;

(4) Prior to the interference inspection, the available trajectory templates T are limited based on the attitude mode "m" of the manipulator M, and thereby an effective retrieval of the trajectory template T can be achieved;

(5) Further, prior to the interference inspection, the execution environment is evaluated, and based on the result of such evaluation a priority order is assigned to the available trajectory template T, thus the effective retrieval for the trajectory template T can be obtained;

(6) Prior to the detailed interference-inspection by the simulation, the trajectory templates T to be used for the detailed interference-inspection are limited by inspecting an interference of the trajectory template T and the obstacle O1. Accordingly, a speed of the interference inspection can be raised; and (7) When determining the priority order on the basis of the moving distance of the trajectory template T, the points are assigned to the respective trajectory templates T on the basis of each actual moving distance thereof, and the priority order is thus determined accurately.

FIG. 38 is an illustrative view (table) of essentials of a second embodiment according to the invention. In the embodiment, a process of assigning the priority order to the trajectory template T is different from the process in the first embodiment. In the former embodiment, it has been described that the execution environment is evaluated, and based on the result of such evaluation the points are assigned to the respective templates T, and each priority order is assigned to the respective trajectory template T.

In contrast to the above, in this embodiment, a priority order table is prepared based on the execution environment which has previously been estimated, and with reference to the evaluation result of the actual execution environment the priority order of the respective trajectory templates T is determined with reference to the priority order table.

FIG. 38 is an illustrative view showing an example of a priority order table in this case, where a vertical axis of the table represents environment modes and a horizontal axis thereof represents each number of priority orders. The environment mode is separated into 40 modes by combinations of the 10 positional relationships (1) to (10) on the xy plane illustrated in FIGS. 16 and 17 and the 4 positional relationships (1) to (4) on the yz plane in FIG. 18. In this case, the priority order is also determined based on the moving distances of the respective trajectory templates T, where such moving distance employed is not a moving distance on the basis of the actual execution environment but an approximate moving-distance determined with reference to the estimated execution environment.

In FIG. 38, The trajectory templates T are registered by their names (T1, T2, . . . ), notwithstanding, the registering by each template number (1, 2, . . . ) may preferably be employed. In such a constitution where the priority order table is previously prepared, the priority order table once prepared can always be used as long as a process of setting the environment mode is not changed. Therefore, a high speed decision process of the priority order is realized unlike the former embodiment wherein the priority order must be determined every time the execution environment is evaluated.

Figure 39:
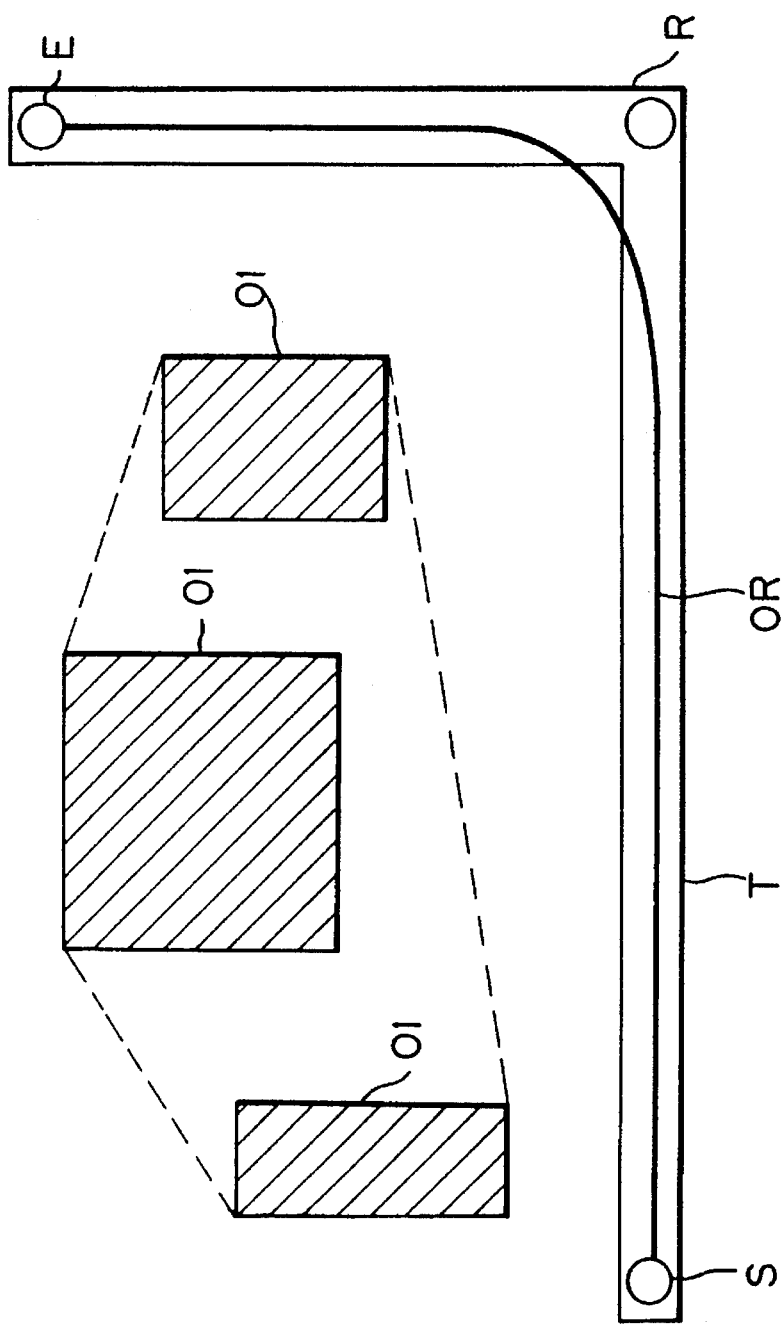
FIGS. 39 through FIG. 43 are illustrative views showing a third embodiment of the present invention explaining an assignment of the intricate head-trajectory of the manipulator.

FIGS. 39 to 43 are illustrative views of a third embodiment according to the invention. In the former embodiment, the simple head-trajectory is produced based on the one trajectory template T. In contrast to the above, in this embodiment, an intricate head-trajectory of the manipulator is produced by coupling a plurality of trajectory templates T. If the number of the obstacles O1 is one or even more than one, as long as the plurality of obstacles O1 are positioned closely to each other to a certain extent as shown in FIG. 39, then the obstacle O1 can be avoided by the single relatively smaller trajectory template T.

Figure 40:
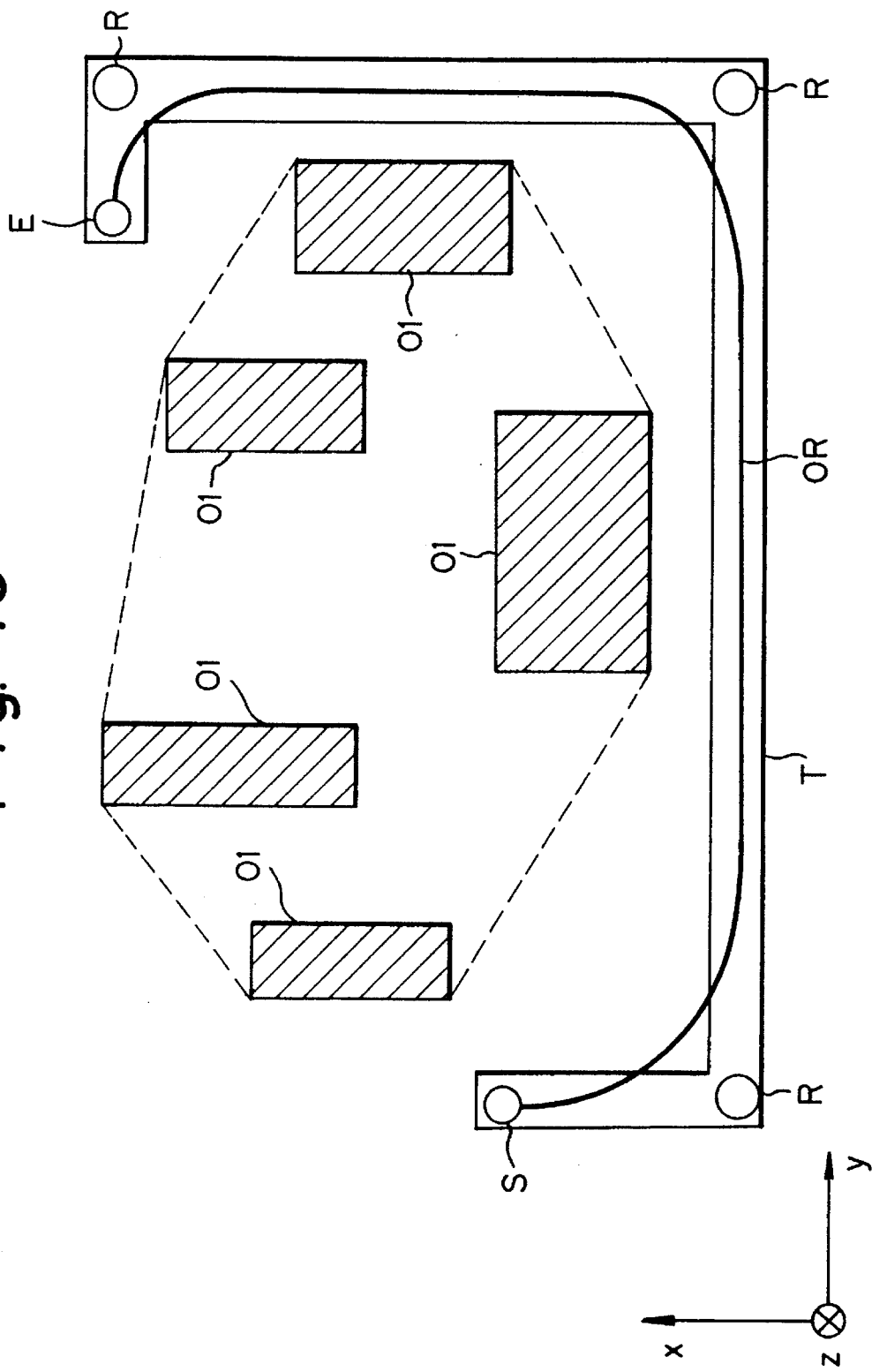

In contrast, when a plurality of obstacles O1 are scatteringly positioned as shown in FIG. 40, in order to avoid the obstacles O1 by the single trajectory template T there must inevitably be used the wasteful trajectory template T where a long detour around the obstacles is required. The trajectory template T with such a long detour cannot be used many times in consideration of a movable range of the manipulator M. The problem arising above can be solved if an intricate-structured trajectory template T capable of passing among the plurality of obstacles O1 is previously prepared.

However, the countermeasure in the above requires that a larger number of trajectory templates T must previously be prepared depending on an arrangement of the obstacles O1. This does not provide a possibility in practical use. Then, in this embodiment, the intricate head trajectory which passes among the obstacles O1 can be produced only by coupling a plurality of trajectory templates T. This constitution is such that the intricate head trajectory can be produced only by preparing the relatively simple-structured trajectory template T as shown and described in FIG. 4A and 4B.

Figure 41:
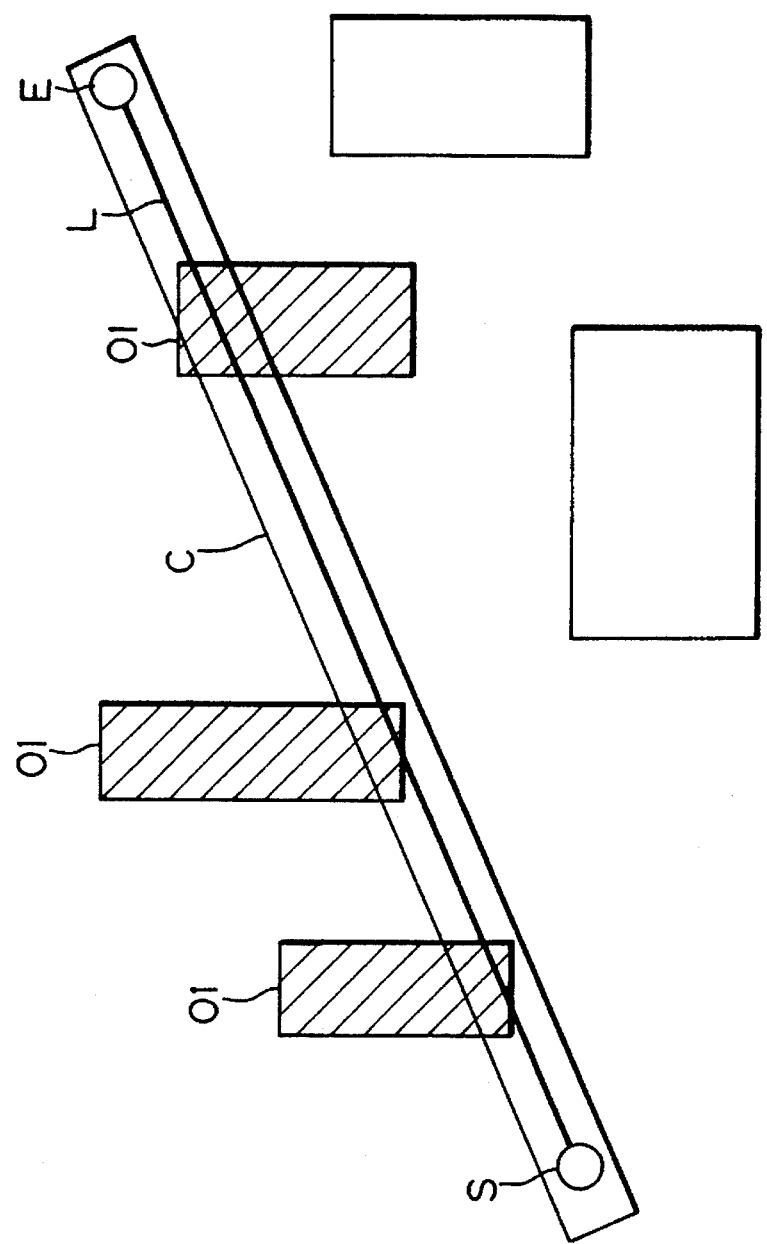
Figure 42:
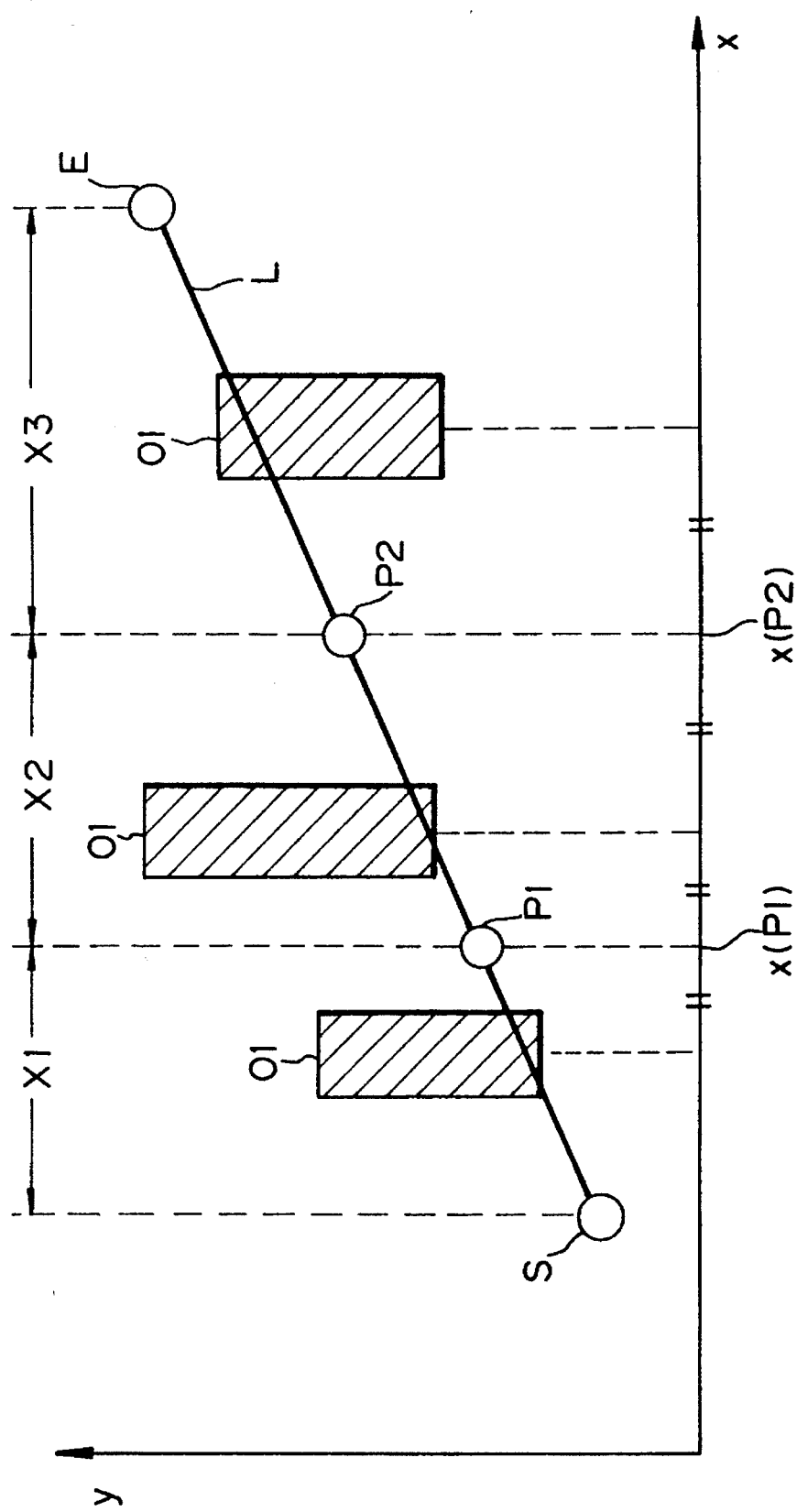
Figure 43:
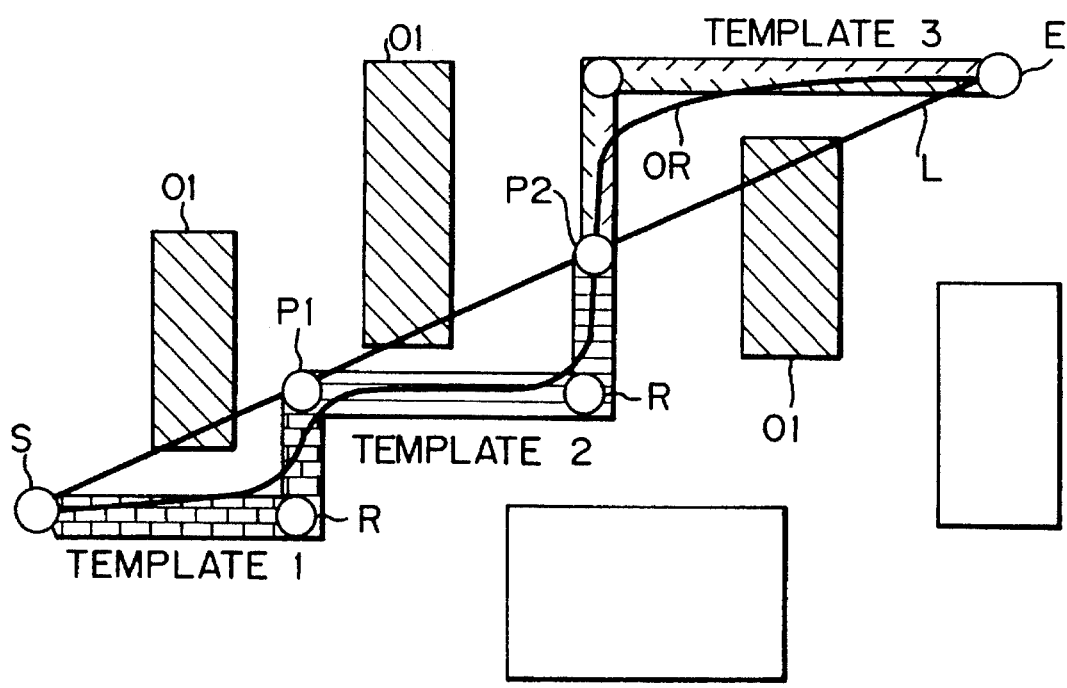

A trajectory producing algorithm in this case is shown in FIGS. 41 to 43. The trajectory producing algorithm is composed of three processes as listed below. A trajectory without waste can be obtained by applying the trajectory template T in the vicinity of a straight trajectory. Three processes are as follows:

(1) A straight trajectory L is drawn from the starting point S to the terminating point E, and an object to interfere with the straight trajectory L is considered as an obstacle O1;

(2) The straight trajectory L is divided into a plurality of sections on the basis of the number of the detected obstacles O1; and (3) At every section there is performed a registering process and a trajectory producing process for each of the trajectory templates T as described in the first embodiment.

The trajectory producing agorithm in this embodiment is an algorithm in which the trajectory producing algorithm of the first embodiment as previously described is added by processes (1) and (2) as a pre-process. The process (1) is shown in FIG. 41, where an object with oblique lines is the obstacle O1 detected by drawing the straight trajectory L. For detecting the obstacle O1, the cube C is practically used instead of the straight trajectory L in consideration of the size of the head of the manipulator M and the size of the held object O2.

The process (2) is shown in FIG. 42, where the three obstacles O1 interfere with the straight trajectory L, which is therefore divided into three sections X1, X2, and X3. The respective sections X1, X2, and X3 are allotted by the one trajectory template T. This indicates that the one obstacle O1 is avoided by the one trajectory template T. The dividing process in the above is concretely a process of obtaining a position of a coupling point P for coupling the trajectory template T. In the drawing, for the existence of three obstacles O1 the coupling point P includes two points P1 and P2. The position of the coupling point P can be obtained by solving "x", "y", and "z" for each coordinate of the coupling point P. The "x" coordinate of the coupling point P can be obtained as an "x" coordinate of a middle point between the adjoining obstacles O1. The "x" coordinate of the middle point is obtained from "x" coordinates of the adjoining obstacles O1. The "y" and "z" coordinates of the coupling point P are obtained by an operation in which the "x" coordinate of the coupling point P obtained in the above way is substituted into an equation of the straight trajectory L.

The process (3) is shown in FIG. 43, where a registering process of size information of the trajectory template T is executed at every divided section X1, X2, and X3. In this case, by using the coupling point P1 as a terminating point E for the divided section X1, the coupling points P1 and P2 as a starting point S and a terminating point E respectively for the divided section X2, and the coupling point P2 as a starting point S for the divided section X3, then a size of the trajectory template T is determined based on size of the obstacles O1 each existing thereamong. The size information of the trajectory template T thus determined is registered in the template storage 43 illustrated in FIG. 3B. A storage region of the size information of the template storage 43 is divided in every divided section X1, X2, and X3, and the size information is stored in every divided section X1, X2, and X3.

When the registering process of the size information of the trajectory template T is terminated, a trajectory producing process is executed at every divided section X1, X2, and X3. An execution in the trajectory producing process proceeds to a limiting process of the available trajectory templates T and a granting process of the priority order for the available trajectory templates T.

The interference of this trajectory template T and the obstacle O1 is inspected at every trajectory template T on the basis of the granted priority order. If it is determined by this interference inspection process that the interference is not present, trajectory data are produced by a curve interpolation for the trajectory template T which is determined when the interference is not present.

Next, a detailed interference-inspection by a simulation is executed based on the above trajectory data. The processes described above are performed for all the divided sections X1, X2, and X3, and finally by interpolating among the starting point S, the terminating point E, and all the relaying points R, the head trajectory OR of the manipulator M is produced.

According to the embodiments as hereinbefore fully described, the head trajectory of the manipulator M is produced by coupling a plurality of trajectory templates T, and therefore the intricate head-trajectory OR can be produced by a small amount of trajectory templates T. The straight trajectory L is divided into a plurality of sections X1, X2, and X3, and the obstacles O1 are avoided by the single trajectory template T at every divided section X1, X2, and X3. This enables production of the manipulator-head trajectory OR with less waste adjacent to the straight trajectory L.

The above-described three embodiments of the automatic manipulator-head trajectory producing system according to the invention are preferably used in the remote operation system as shown in FIG. 3A.

FIG. 44 is a block diagram of a system constitution in which the invention is applied to producing the manipulator-head trajectory in the remote operation system of a space robot. In FIG. 44, numeral 70 denotes an execution system, 80 an operation system, and 90 a communication satellite for realizing a communication between the execution system 70 and the operation system 80.

The execution system 70 includes a manipulator a communication control section 72, an instruction decoder section 73, and a robot controller 74. And the operation system 80 includes a language input system 81, an action producing section 82, a communication control section 83, and a robot simulator 84. In the system illustrated in FIG. 44, the manipulator 71 is not operated by the master/slave system but is operated by a robot language.

Namely, the robot language text written as a high level robot language which is output from the language input system 81 is automatically expanded into a language with an actually operable level by the manipulator 71 through the action producing section 82, and the thus expanded primitive language trains are executed by the manipulator 71.

The invention can be applied to produce the trajectory of the remote operation system having systems other than the master/slave system. When the robot language is expanded by the action producing section 82, the trajectory producing system 41 is repeatedly called depending on requirements. Thereby, the trajectory data produced by the trajectory producing system 41 are incorporated into the robot-language which has been expanded, and then the results are executed by the manipulator 71.

The three embodiments and two application examples according to the invention have hereinbefore been described, nevertheless, the invention is not limited to such embodiments and application examples as shown and described. The following are examples of possible applications according to the present invention.

(1) The embodiments have employed the trajectory template T having the U and L character shapes respectively, but notwithstanding, the invention is not limited to such shapes of the trajectory template T, and, according to the invention, trajectory templates T having various shapes other than those as hereinbefore described may preferably be used.

(2) In the embodiments, the available trajectory template T is limited prior to the interference inspection, however, such a limiting process may preferably be omitted according to the invention.

(3) In the embodiments, the priority order is assigned to the trajectory template T prior to the interference inspection, but, according to the invention, such a priority-order assigning process may be omitted.

(4) In the embodiments, the interference inspection of the trajectory template T and the obstacle O1 is performed prior to the detailed interference inspection, but, according to the invention, such interference inspection of the trajectory template T and the obstacle O1 may be omitted.

(5) In the embodiments, it has been described that the invention is applied to the manipulator-head trajectory producing system of the remote operation system, however, the invention can be applied to manipulator-head trajectory producing systems having various systems other than such a remote operation system.

(6) It is to be understood that the foregoing description is of preferred embodiments of the invention that various changes and modifications may be made to this invention without departing from the essentials or scope of the invention.

As hereinbefore fully described, according to the invention, an automatic manipulator-head trajectory producing system is provided wherein a head trajectory of a manipulator may automatically be produced with a smaller memory capacity in a reduced time.

What is claimed is:

1. An automatic manipulator-head trajectory producing system, provided in a remote-controlled operation system having an operation system and an execution system, for automatically producing a trajectory of a manipulator-head remote-controlled by an operation in the operation system at a distance from the working site of the manipulator-head, an environment model storage memory being communicatably connected to the automatic manipulator-head trajectory producing system, said environmental model storage memory storing information of an execution environment of the manipulator-head including an arrangement of the manipulator-head and obstacles, comprising:

trajectory template register means for previously storing a plurality of trajectory templates designating an estimated head-trajectory of a manipulator on the basis of an execution environment of the manipulator;

manipulator-head trajectory producing means for producing a head trajectory by inspecting templates for an interference of the manipulator and an obstacle for each of said trajectory templates previously stored by the trajectory template register means wherein each trajectory template includes data of a set of a plurality of solid bodies, and the trajectory template register means stores the trajectory template data by positional information of relaying points corresponding to coupling points of solid bodies and width information of the respective trajectory template, and defines an absolute position of each of the relaying points based on a size of each of the obstacles.

2. A system as set forth in claim 1, wherein the trajectory template register means defines a width of the trajectory template based on a size of an object which the manipulator-head holds.

3. A system as set forth in claim 1, wherein the trajectory template register means evaluates all of the objects existing on a straight trajectory from the present position to the target position as obstacles.

4. A system as set forth in claim 1, further comprising a template limiting section in the manipulator-head trajectory producing means, which limits an available trajectory template from among the trajectory templates stored by the trajectory template register means on the basis of an attitude mode of the manipulator-head, and by producing the manipulator-head trajectory on the basis of the trajectory template determined as available by the template limiting section.

5. A system as set forth in claim 1, further comprising a priority order granting section in the manipulator-head trajectory producing means which grants a priority order to respective trajectory templates stored by the trajectory template register means based on the execution environment of the manipulator, the manipulator-head trajectory being produced said manipulator-head trajectory means on the basis of the priority order of the trajectory templates granted by the priority order granting section.

6. A system as set forth in claim 5, wherein the priority order granting section determines the priority order and grants priority rating points on basis of a positional relationship between a present position and a target position of each of the manipulator and the obstacle.

7. A system as set forth in claim 6, wherein the priority order granting section determines the priority orders of the respective trajectory templates by granting each said priority rating point to the respective trajectory templates on the basis of the positional relationship.

8. A system as set forth in claim 1, further comprising a priority order granting section including a priority order table previously written with the priority order of the trajectory templates on the basis of an estimated positional relationship, and by determining the priority order of respective trajectory templates by referring to the priority order table on the basis of an actual positional relationship.

9. A system as set forth in claim 1, further comprising:

a first interference inspecting section which inspects an interference of the trajectory template and the obstacle for each said trajectory template stored by the trajectory template register means;

a curve interpolation section that interpolates the trajectory template after determination, by the first interference inspecting section on the basis of operation characteristics of the manipulator, that the trajectory template is not interfered with; and a second interference inspecting section that inspects an interference of the manipulator and the obstacle on the basis of an interpolation result by the curve interpolation section.

10. A system as set forth in claim 1, wherein the trajectory template register means divides a straight trajectory between a present position and a target position of the manipulator-head into a plurality of sections, and the trajectory template is stored at every divided section.

11. A system as set forth in claim 1, wherein the present position of the manipulator is obtained by an inquiry to the environment model storage memory, and a target position thereof is externally input.

12. A system as set forth in claim 11, wherein the manipulator is able to be remotely operated based on a master/slave system, a target position being input by an operation of a master manipulator of the master/slave system.

13. An automatic manipulator-head trajectory producing system, provided in a remote-controlled operation system having an operation system and an execution system, for automatically producing a trajectory of a manipulator-head remote-controlled by an operation in the operation system at a distance from the working site of the manipulator-head, an environment model storage memory being communicatably connected to the automatic manipulator-head trajectory producing system, said environmental model storage memory storing information of an execution environment of the manipulator-head including an arrangement of the manipulator-head and obstacles, comprising:

trajectory template register means for previously storing a plurality of trajectory templates designating an estimated head-trajectory of a manipulator on the basis of an execution environment of the manipulator;

manipulator-head trajectory producing means for producing a head trajectory by inspecting templates for an interference of the manipulator and an obstacle for each of said trajectory templates previously stored by the trajectory template register means;

a priority order granting section, included in the manipulator-head trajectory producing means, granting a priority order to respective trajectory templates stored by the trajectory template register means based on the execution environment of the manipulator, the manipulator-head trajectory being produced by said manipulator-head trajectory means on the basis of the priority order of the trajectory templates granted by the priority order granting section, said priority order granting section determining the priority order and granting priority rating points on a basis of a positional relationship between a present position and a target position of each of the manipulator and the obstacle.

14. A system as set forth in claim 13, wherein the priority order granting section determines the priority orders of the respective trajectory templates by granting each said priority order rating point to the respective trajectory templates on the basis of the actual positional relationship.

15. An automatic manipulator-head trajectory producing system, provided in a remote-controlled operation system having an operation system and an execution system, for automatically producing a trajectory of a manipulator-head remote-controlled by an operation in the operation system at a distance from the working site of the manipulator-head, an environment model storage memory being communicatably connected to the automatic manipulator-head trajectory producing system, said environmental model storage memory storing information of an execution environment of the manipulator-head including an arrangement of the manipulator-head and obstacles, comprising:

trajectory template register means for previously storing a plurality of trajectory templates designating an estimated head-trajectory of a manipulator on the basis of an execution environment of the manipulator;

manipulator-head trajectory producing means for producing a head trajectory by inspecting templates for an interference of the manipulator and an obstacle for each of said trajectory templates previously stored by the trajectory template register means;

a first interference inspecting section which inspects an interference of the trajectory template and the obstacle for each said trajectory template stored by the trajectory template register means;

a curve interpolation section that interpolates the trajectory template after determination by the first interference inspecting section on the basis of operation characteristics of the manipulator, that the trajectory template is not interfered with; and a second interference inspecting section that inspects an interference of the manipulator and the obstacle on the basis of an interpolation result by the curve interpolation section.

* * * * *